US006684917B2

(12) United States Patent
Zhu et al.

(10) Patent No.: US 6,684,917 B2
(45) Date of Patent: Feb. 3, 2004

(54) APPARATUS FOR VOLUMETRIC METERING OF SMALL QUANTITY OF POWDER FROM FLUIDIZED BEDS

(75) Inventors: Jesse Zhu, London (CA); Jianzhang Wen, London (CA); Ying Liang Ma, London (CA); Hui Zhang, London (CA)

(73) Assignee: The University of Western Ontario, London (CA)

( * ) Notice: Subject to any disclaimer, the term of this patent is extended or adjusted under 35 U.S.C. 154(b) by 39 days.

(21) Appl. No.: 10/016,129

(22) Filed: Dec. 17, 2001

(65) Prior Publication Data

US 2003/0111131 A1 Jun. 19, 2003

(51) Int. Cl.[7] .............................................. B65B 31/00
(52) U.S. Cl. .............................. 141/18; 141/45; 141/54; 141/67; 141/236; 141/286; 141/302; 141/307; 222/195; 222/630
(58) Field of Search ............................... 141/18, 44, 45, 141/54–56, 67–70, 234, 236, 285, 286, 301, 302, 307; 222/189.06, 190, 195, 196, 630, 636, 637

(56) References Cited

U.S. PATENT DOCUMENTS

| | | | |
|---|---|---|---|
| 5,323,930 A | * 6/1994 | Masclet et al. | ............... 222/71 |
| 5,469,994 A | * 11/1995 | Reh et al. | ................... 222/630 |
| 5,579,588 A | 12/1996 | Reh et al. | |
| 5,826,633 A | 10/1998 | Parks et al. | |
| 5,939,027 A | 8/1999 | Ruelle | |
| 6,183,169 B1 | 2/2001 | Zhu et al. | |
| 6,197,369 B1 | 3/2001 | Watano et al. | |

FOREIGN PATENT DOCUMENTS

| | | |
|---|---|---|
| EP | 1099472 | 5/2001 |
| GB | 986842 | 3/1965 |
| WO | 0029452 | 5/2000 |
| WO | 0128900 | 10/2000 |

OTHER PUBLICATIONS

Qian, Gui–Hua, Bagyi, Istvan, Pfeffer, Robert, and Shaw, Henry, "Particle Mixing in Rotating Fluidized Beds: Inferences About the Fluidized State", AIChE Journal, Particle Technology and Fluidization, Jul. 1999, vol. 45, No. 7, pp. 1401–1410.

Qian, Gui–Hua, Bagyi, Istvan, Pfeffer, Robert, Shaw, Henry and Stevens, John G., "A Parametric Study of a Horizontal Rotating Fluidized Bed Using Slotted and Sintered Metal Cylindrical Gas Distributors", Elsevier Science S.A., Powder Technology vol. 100, 1998, pp. 190–199.

(List continued on next page.)

*Primary Examiner*—Gregory L. Huson
*Assistant Examiner*—Peter deVore
(74) *Attorney, Agent, or Firm*—Lynn C. Schumacher; Hill & Schumacher

(57) ABSTRACT

The present invention provides a fluidized bed for dispensing small quantities of powders. The fluidized bed is made using a porous housing to permit injection and removal of fluid through the surrounding walls to improve the operation of the bed particularly for small particles of the group C size, including significantly reducing powder adhesion to the walls. In one aspect of the invention the fluidized bed housing is rotated about its longitudinal axis, which may be oriented at any suitable angle. A system for changing the volume of the bed is described as is a system for incorporating injection nozzles within the bed for constant agitation and prevention of powder adhering to the walls of the housing.

82 Claims, 19 Drawing Sheets

OTHER PUBLICATIONS

Figure 1:
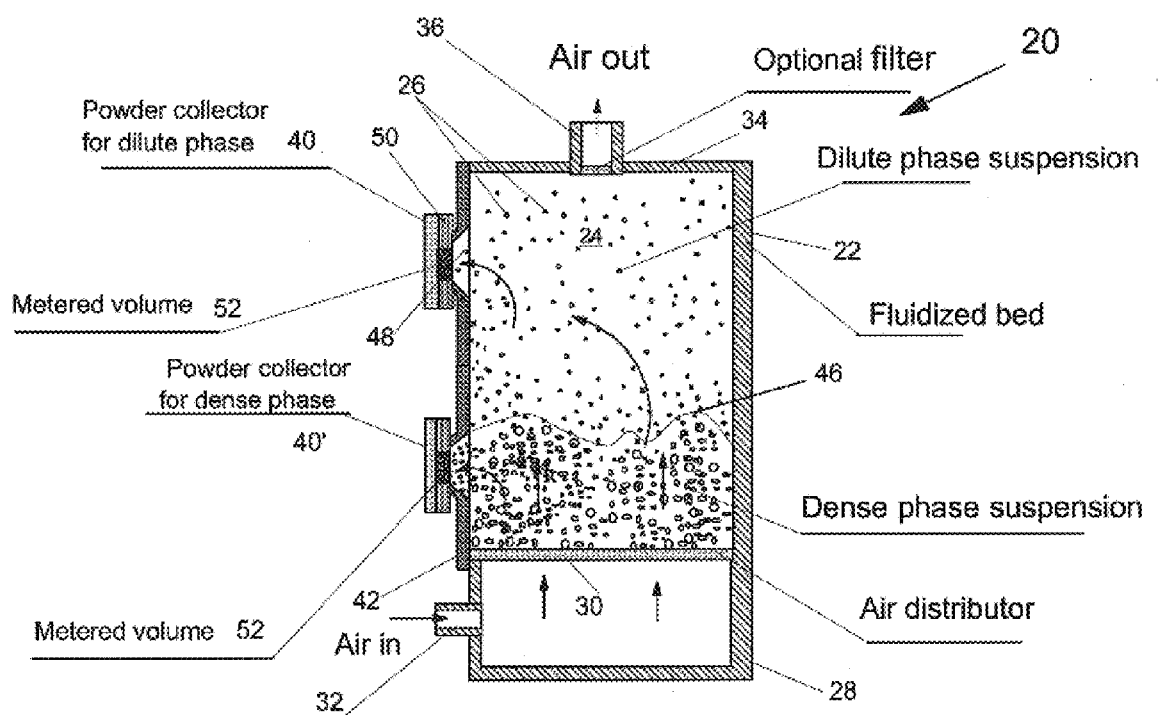

Kao, J., Pfeffer, R. and Tardos, G.I., "On Partial Fluidization in Rotating Fluidized Beds", AIChE Journal, May 1987, vol. 33 No. 5, pp. 858–861.

Pfeffer, Robert, Tardos, Gabriel I., and Gal, Eli, The Use of a Rotating Fluidized Bed As a High Efficiency Dust Filter, Fluidization V, 1986, pp. 667–675.

* cited by examiner

Figuire 17a

APPARATUS FOR VOLUMETRIC METERING OF SMALL QUANTITY OF POWDER FROM FLUIDIZED BEDS

FIELD OF THE INVENTION

The present invention relates to devices for the metering of small quantities of powder from fluidized beds through a volumetric measuring device.

BACKGROUND OF THE INVENTION

Accurate metering of a given quantity of powder is often required in various processes including chemical engineering and pharmaceutical processes. When the metered quantity is large, this is relatively easily achieved. However, when the required quantity is very small, this becomes very difficult if high accuracy is required at the same time. In addition, if very fine powder is used, strong interparticle forces cause the powder to agglomerate, thus making the precise metering even more difficult.

Pulmonary drug delivery represents a new drug administration method that provides many advantages. It provides direct and fast topical treatments to respiratory and lung diseases. It has less first-pass GI (gastrointestinal) metabolism and can provide targeted delivery to heart and brain. Drugs such as peptides can be systemically delivered using the pulmonary channel. Pulmonary drug delivery also allows the use of drugs with low solubility. Antibiotics and even vaccines can be delivered in this manner. Compared to oral in-take, it provides a fast and much more efficient adsorption. Typically, only a few percent of the medication of the oral in-take is required for pulmonary delivery. Compared to intravenous injection, it provides a painless and safe alternative.

To facilitate pulmonary delivery, drug powders should normally be less than 5 μm so that they become airborne during inhalation. However, powders of such small sizes (typical group C powder in the Geldart classification) have very strong interparticle forces that make them agglomerate and cohesive, and thus very difficult to handle. Since the required dosage for pulmonary delivery is also very small (usually in the order of 1 μg–100 mg), this makes it very difficult to accurately meter such a small quantity and fill them into packages.

To overcome the interparticle forces, current industrial practice applies two different methods; one involves mixing the ultrafine drug powders with large amounts of coarser powder, and the other the suspension of the powder in liquid. The first method uses a large quantity of excipient (filler) particles that are much larger (normally group A or group A-C powders in the Geldart classification). This makes the small-large powder mixture fluidize and flow easily so that they can be handled more easily. It also significantly increases the volume of each dosage so that the dispensing becomes more accurate when the drug powder is packaged into the Dry Powder Inhaler (DPI). However, only a small fraction of the small drug particles can detach effectively from the large excipient particles during inhalation and the rest stay with the large particles and land in the mouth, limiting the efficiency of final delivery to about 10–15%.

The second method involves suspending the ultrafine drug powders into liquids such as hydrocarbon propellants and storing them in Metered Dose Inhalers (MDI). When a metered quantity of the propellant is released from the storage canister, the propellant evaporates and expands quickly to disperse the powdered drug into the patients' mouth. The key problem with this method is that the quick expansion of the propellant causes the drug to impact in the back of the throat and other places in the mouth, reducing the amount being inhaled into the lung to less than 10–15%. This method also needs good breath coordination, since it is difficult to predict the amount of drug inhaled if the patients' inhalation does not coincide with the drug releasing.

Thus both currently practiced methods have significant limitations. It would be ideal if the required small quantity of the fine drug powder could be accurately dispensed alone, without any other chemical or physical constituents. When only the pure drug powder is packaged into the inhaler, the delivery efficiency is expected to increase significantly. However, this tends to be fairly difficult if the quantity to be packaged is extremely small. For example, if each dose contains 0.5 mg or 500 μg of drug powder and the bulk (packed) density of the powder is 0.5 $mg/mm^3$(=500 $kg/m^3$), the total volume of the powder withdrawn for each dose is only 1.0 $mm^3$.

Fluidization occurs when particulate materials of sub-micrometers to several millimeters are suspended by up-flowing gas in a vessel or column to form a gas-solid suspension more commonly referred to as a fluidized bed. The fluidized beds formed with the gas-solid suspension are specifically referred to as gas-solid fluidized beds. The term "fluidized bed" applies because the gas-solid suspension formed by the solid particles and the upflowing gas behaves like a fluid. Although primarily gas is used as fluidizing fluid, liquid can also be used. In some cases, both gas and liquid are used together. Those are called liquid-solid fluidized beds and gas-liquid-solid three-phase fluidized beds.

A gas-solid fluidized bed can operate in several fluidization regimes: particulate, bubbling, slugging and turbulent fluidization regimes (conventional fluidized beds), and fast fluidization and pneumatic transport regimes (high-velocity fluidized beds). In a conventional fluidized bed, there are usually two distinct regions: the upper dilute region (also called the freeboard region) and the bottom dense region which has most of the particles and also contains many more particles per volume than the dilute region. In a high-velocity fluidized bed, almost all particles are carried upwards by the high-velocity upflow gas and almost the entire bed is in a dilute suspension region. There is also a downflow fluidization regime where gas and particles flow co-currently downward in a dilute suspension form.

A typical design of a fluidized bed includes a gas distributor at the bottom of the fluidized bed column, the main function of which is to uniformly distribute the gas into the fluidized bed. The vessel that contains the fluidized bed can have any suitable shape, but those with cylindrical or rectangular cross-sections and oriented on a substantially vertical axis are commonly used. The vertical walls are usually of solid materials to prevent the gas and solids from escaping from the fluidized beds.

Sometimes, it is necessary to have solid feeds and withdrawal ports and/or heat transfer tubes or panels mounted on the wall(s) of a fluidized bed. At the top of the bed, there is usually a plate or similar structure that seals the top of the fluidization column. There is usually at least one exit port through the top plate and/or the side wall not far below the top plate that allow gas and entrained solids to leave the fluidized bed and enter into gas-solid separation devices or other vessels or other process units. Those particles that leave the fluidized bed are entrained out by the gas flow, i.e. by solids entrainment.

Powders may be classified into four groups in gas-solid fluidized systems, according to Geldart's classifications.

Groups B and D powders comprise large particles that typically result in large bubbles when fluidized. Group A powders comprise particles that first experience a significant expansion of the powder bed when fluidized before bubbles begin to appear. Group C powders comprise very small particles for which the interparticle forces significantly affect the fluidization behaviour. As the particle size reduces, interparticle forces increase significantly. Those strong interparticle forces cause the fine particles to agglomerate and make them very cohesive. Typical Group C powders comprise particles under 30–45 μm in size, although some very sticky powders larger than these sizes may also belong to Group C powders. Due to strong interparticle forces, Group C powders are either very difficult to fluidize (with channeling and/or very poor fluidization) or mainly fluidize with the large agglomerates as pseudo-particles rather than as individual particles. In either case, fluidization of individual particles cannot be achieved easily so that handling of Group C powders becomes a difficult problem.

Different measures can be taken to assist the fluidization of Group C powders. Those methods are usually referred to as fluidization aids. Fluidization aids include mechanical stirring, mechanical, acoustic or ultrasonic vibration, addition of much larger particles or other objects to provide extra stirring, addition of finer particles to act as "lubricant", pulsation of fluidization gas, etc. Some aids are more effective than others for a given Group C powder, but the effectiveness of almost all aids tends to diminish as the powder becomes finer.

Group C powders also tend to clog up in certain areas of the fluidized bed, such as above the gas distributor, around internals and at exit port(s), and to stick to the internal wall or the ceiling of the bed. Large chunks of powder form in those places and then break from time to time as they grow and become unstable. As those chunks of particles from the ceiling or upper portion of the bed fall back into the fluidized bed, they disturb the flow hydrodynamics inside the bed, causing periodical variation of the bed density and other properties in both the bottom dense phase region and the upper dilute phase region.

Key characteristics of fluidized beds include easy handling of particles, excellent contact between gas and solids, excellent heat and mass transfer between gas and solids and between gas-solid suspensions and the column wall, good gas and solids mixing, etc. These and other useful characteristics have led to the wide application of fluidized beds in process and other industries. The "easy handling of particles" is due to the uniform solids suspension inside the bed and the relatively free movement of the particles within the gas-solids suspension and of the suspension itself.

Several well known problems currently exist with the fluidized beds pertaining to the metering of fine particles, especially Group C particles. Solids entrainment can sometimes cause problems to the maintenance of a uniform suspension, since entrained particles may flow out of the fluidized bed with the gas stream from the top exit. In order to maintain a constant suspension, escaped particles must be separated from the gas stream (by cyclone, bag filter and/or other devices) and returned. Because there is limitation on the separation efficiency, some particles may be lost even with several stages of separation, leading to a reduction of the powder inventory. This presents a serious problem in some cases where it is essential not to lose particles, such as in the case where expensive drug powder is handled. In this case, a filter may be installed inside or just at the exit port to stop the entrained particles from flowing out of the bed in the first place. However, such filters are plugged very quickly that periodical purging is essential. In addition, such filters also produce a high pressure drop that a very large filter area has to be created to allow enough gas to flow through.

The main problem associated with particle loss and with the gradual decrease of solids inventory due to continuous metering out of particles, is the reduction of solids suspension density. Such variations in solids suspension density may reduce the accuracy of powder metering from the fluidized bed. One measure is to continuously add additional particles into the fluidization column. An alternative measure proposed in this invention and discussed hereinafter is to gradually decrease the volume of the fluidized bed by moving one or more side of the column wall inwards.

Another problem with fluidized beds is that local dead zones or defluidization may occur due to the non-uniform gas distribution at the bottom or due to other reasons such as agglomeration of fine or ultrafine (Group C) particles. This can result in non-uniform and unpredictable suspension density, and other undesirable consequences. For greater certainty, particle agglomeration happens when very fine powder, such as the drug powder for pulmonary drug delivery, is fluidized. Such agglomeration causes non-uniform solids suspension and solids flow, greatly reducing the accuracy of powder metering from the fluidized bed.

Yet another problem is that some particles tend to stick on the inner wall or the top plate of the fluidization vessel/column. This is especially true when very fine particles are fluidized. This can lead to unwanted solids accumulation on the wall. Accumulation of particles on the wall reduces the solids holdup (=concentration) in the bed, making it difficult to precisely control the fluidized bed density, as desired in some processes. Those particles stuck on the wall may also fall periodically back to the bed (for example, when the accumulation is too thick), changing suddenly the bed density, that is, the solids concentration in the bed. A rotating fluidized bed can be used to overcome this problem. The concept of rotating fluidized bed with porous walls is known, however such beds are rotated to generate centrifugal force to the particles in the bed and are known as centrifugal fluidized beds. In these devices, the cylindrical wall is porous. The porous wall is used as gas distributor for the fluidizing gas to flow inward in all radial directions into the bed and the gas exits through the axial end(s) of the cylinder. The purpose of rotating the cylindrical (horizontal or vertical) vessel is to create a centrifugal force to hold the particles towards the cylindrical wall so that higher fluidization velocity can be used without producing large bubbles in the bed and/or without having significant solids entrainment. This allows the same bed to be operated at higher gas velocity so that the process capacity is increased. Example references that provide the details of such rotating fluidized beds include R Pfeffer, G I Tardos and E Gal, "The use of a rotating fluidized bed as a high efficiency dust filter", in Fluidization V, eds., K. Ostergaard and A. Sorensen, Eng. Foundation, New York, pages 667–672, 1986; J. Kao, R Pfeffer and G I Tardos, "On partial fluidization in rotating fluidized beds", American Institute of Chemical Engineering Journal, Volume 33, pages 858–861, 1987; Qian G-H, I Bagyi, R Pfeffer, H Shaw and J G Stevens, "A parametric study on a horizontal rotating fluidized bed using slotted and sintered metal cylindrical gas distributors", Powder Technology, Volume 100, pages 190–199, 1998; Qian G-H, I Bagyi, R Pfeffer and H Shaw, "Particle mixing in rotating fluidized beds: inferences about the fluidized state ", American Institute of Chemical Engineering Journal, Volume 45, pages 1401–1410, 1999; and U.S. Pat. No. 6,197,369.

However, the key design concepts and the purpose of such prior art centrifugal fluidized beds are significantly different from the rotating and porous fluidized bed dispenser proposed in this invention.

U.S. Pat. No. 5,826,633 issued to Parks et al. is directed to a powder filling apparatus which uses gravity to assist filling of a metered chamber. The metered chamber is placed below a convergent passageway containing the powder that is being dispensed. While the method and device involves "fluidizing" the powder to overcome inter-particle cohesive forces, they defined fluidizing powder as "the powder is broken down into small agglomerates and/or completely broken down into its constituents or individual particles". In their definition, upflowing gas is not essential to cause the powder to be fluidized. This is significantly different from the conventional definition of fluidization, as followed in this patent application, that powder is fluidized when it is suspended in an upflowing gas (or liquid). As a result, the device is not per se a fluidized bed since in this device all particles fall unassisted by gravity. In conventional fluidized beds particles are suspended by the fluidizing gas and very few, if any, particles can fall unassisted by gravity. Further, some typical components of a fluidized bed such as an air distributor is missing in this device. In addition, other problems as described above in this invention, such as sticking of particles to the inner surface of the convergent chamber is still problematic with this type of device.

U.S. Pat. No. 6,183,169 issued to Zhu et al. is directed to a device for precision dispensing of fine powders. This device includes two fluidized bed chambers communicating with each other and operates by first fluidizing a fine powder in one chamber and then using a pressure differential between the chambers to draw the fluidized particles into the second chamber. A solenoid valve attached to the second chamber is opened for a selected period of time to dispense the powder in the form of gas-solid suspension to a collection area. The two-chamber concept utilized by Zhu et al. in U.S. Pat. No. 6,183,169 is different from the one used in the current invention. It uses a two-stage method to dilute and control the gas-solids suspension and a Venturi mechanism to control the powder flow and to transport the powder from one stage to another, while the current invention only has one stage and does not require a Venturi or anything of such kind to control powder flow. In the device disclosed in Zhu et al. powder withdrawal is from the dilute phase in the second chamber.

Obviously, the key concepts of both U.S. Pat. Nos. 5,826,633 and 6,183,169 are different from the current invention.

In view of the difficulties and complexities with the prior art, it would be advantageous to provide a single fluidized bed which can dispense quantities of fine powder in an accurate and controlled manner which can be used for either batch or continuous processing of the fine powders. It would also be very advantageous to provide a fluidized bed system that significantly reduces solids accumulation on the walls of the fluidized bed, achieves total solids containment in the bed except for targeted particle withdrawal through selected ports, reduces or eliminates dead zones, and/or allows for the addition and removal of gas at various locations in the fluidized bed.

SUMMARY OF THE INVENTION

This invention utilizes the uniform solids suspension and easy mobility of particles inside the fluidized bed, from which particles are uniformly withdrawn to a fixed-volume cavity so that a definite quantity of particles can be metered out from the fluidized bed. To ensure consistency and accuracy of such powder metering, it is essential to maintain a constant and consistent gas-solids suspension inside the fluidized bed.

The method disclosed herein involves metering the powder flow from a fluidized bed where the particle suspension has a much lower density than that of packed (bulk) particles so that the withdrawal volume is significantly increased to increase metering accuracy, and where the particles are completely mobile so that a consistent withdrawal can be maintained.

The present invention also discloses rotating the porous fluidized bed to alternately switch the gas distributor, the bed wall and/or the top gas exit plate, so that particles stuck onto the wall can be continuously back purged off the wall when they are rotated to the bottom of the bed where the gas is introduced in the bed.

The current invention proposes the following alternatives to provide further agitation to the powder to enhance uniform fluidization: (1) rotating the fluidized bed, with or without adding large beads in the bed; (2) injecting additional gas into the bed at various locations in the bed through gas nozzles; and (3) using gas nozzles with flexible tube that can move randomly inside the bed.

An object of the present invention is to provide accurate volumetric metering of powder, either by filling a receptacle of given volume or by timing the powder flow at a given volumetric flow-rate, from a fluidized bed. In particular, this invention addresses the problems associated with metering of extremely small quantities (1 $\mu$g–100 mg) of ultrafine (<10 $\mu$m) powders. To ensure precise metering, the invention provides fluidized bed structures that intend to ensure uniform and relatively constant gas-solids suspension inside the fluidized bed, by minimizing the problems associated with maintaining uniform gas-solids suspension and uniform fluidization. This invention also provides effective means to volumetrically meter and withdraw the required small quantities of powder in a very accurate and controlled manner.

It is a further object of the present invention to provide a fluidized system that may be used for reduction of solids accumulation on the walls, to provide a system that may be used for reduction or elimination of dead zones, and to provide a system that may be used to add and remove gas at various locations (e.g., along the axial direction).

Broadly, the present invention relates to metering a small quantity of powder from a fluidized bed using a volumetric method. It can be just any fluidized bed that can provide a steady gas-solid suspension and the withdrawal can be either from the dense phase or the dilute phase of the bed. An element of some suitable shape that has one or more cavities and that can be easily engaged and disengaged to the said fluidized bed with the cavities exposed to the fluidized bed is used for the metering and withdrawal.

Furthermore, the present invention relates to a fluidized bed structure comprising having a housing defining a fluidized bed chamber, means for introducing primary fluidizing fluid through one or more portion(s) of the surrounding walls into the chamber at one or more side(s) of the chamber and means for permitting the escape of the fluid through one or more portion(s) of the surrounding walls from the chamber at other one or more side(s) of said chamber. At least some of the walls of the chamber have a significant area that is porous, the porous area comprising pores having a size sufficiently small to prevent significant loss of particles from the fluidized bed.

This invention further relates to a powder metering and withdrawal mechanism that is attached to the fluidized bed. This mechanism includes an element of some suitable shape that has one or more small cavities (pockets, holes) and means (withdrawal port) to engage and disengage such element easily to/from the fluidized bed with the cavities exposed to the gas-solid suspension inside the fluidized bed.

In one aspect the present invention provides a fluidized bed for dispensing powders, comprising:

a) a housing defining an enclosure for containing particulate matter, said housing including a fluid injection means for injecting a fluid into said enclosure for fluidizing particulate matter contained within said housing for forming a dilute phase and a dense phase of fluidized powder in said housing; and b) volumetric metering means connected to said housing and in flow communication with said enclosure through an outlet passageway for withdrawing pre-selected amounts of said particulate matter from said housing.

In another aspect of the invention there is provided a fluidized bed for dispensing powders, comprising:

a) a housing defining an enclosure for containing particulate matter, said housing including at least one porous wall having a suitable porosity to allow flow of fluid through said porous wall while preventing most of the particulate matter contained within said housing from passing through said porous wall, a fluid injection means for injecting a fluid into said enclosure for fluidizing particulate matter contained within said housing for forming either a dilute phase only or a dilute phase and a dense phase of fluidized powder in said housing; and b) time controlled powder withdrawal means connected to said housing and in flow communication with said enclosure through an outlet passageway for withdrawing particulate matter from said housing for a preselected period of time.

BRIEF DESCRIPTION OF THE DRAWINGS

Further features, object and advantages will be evident from the following detailed description of the present invention taken in conjunction with the accompanying drawings, in which:

FIG. 1 is a cross sectional view of a conventional fluidized bed modified in accordance with the present invention to include two powder metering and withdrawal units on the side wall for powder withdrawal, one from the top dilute phase region and the other from the bottom dense phase region;

FIG. 2 shows another embodiment of a fluidized bed similar to FIG. 1 in which the powder metering and withdrawal unit includes a porous filter behind the powder collector and an airflow through it (with or without vacuum suction) to enhance the powder withdrawal process;

FIG. 3*a* is a cross sectional view of another embodiment of a fluidized bed constructed in accordance with the present invention having porous walls;

FIG. 3*b* is a view along arrow A of FIG. 3*a;*

FIG. 4*a* is a cross sectional view of a porous fluidized bed oriented for rotation about a horizontal axis of the bed housing with the powder metering and withdrawal unit located on the end plate;

FIG. 4*b* is a view along arrow A of FIG. 4*a;*

FIG. 5 is a cross sectional view of an embodiment of an air distribution and/or air withdrawal chamber for the fluidized bed of the present invention;

FIG. 6*a* is a cross sectional view of fluidized bed oriented for rotation about the horizontal axis of the housing and having a slide plate for adjusting the volume of the interior of the fluidized bed;

FIG. 6*b* is the side view of FIG. 6*a;*

FIG. 7*a* is a cross sectional view of a fluidized bed oriented for rotation about the horizontal axis of the housing and having a gas purging tube inserted along the horizontal axis of the housing;

FIG. 7*b* is the side view along arrow A of FIG. 7*a;*

FIG. 8 is a cross sectional view of a fluidized bed oriented for rotation about the horizontal axis of the housing and having gas injection nozzles located within the fluidized bed for producing additional agitation and/or jet milling action within the bed;

FIG. 9 is a cross sectional view of an embodiment of a fluidized bed having a source of vibration contacting the housing or the particles inside through a mesh for additional agitation of the powder;

FIG. 10 is a cross sectional view of an embodiment of a fluidized bed having a source of sonic vibration from the bottom of the bed (within the distributor box) for additional agitation of the powder;

FIG. 11*a* is a cross sectional view of fluidized bed oriented for rotation about the horizontal axis of the single cylinder housing and having a slide plate for adjusting the volume of the interior of the fluidized bed, within a sealed casing;

FIG. 11*b* is a view along arrow A of FIG. 11*a;*

FIGS. 12*a* and 12*b* are top and side views respectively of an embodiment of a powder metering and withdrawal unit constructed in accordance with the present invention;

FIGS. 13*a* and 13*b* are top and side views respectively of an alternative powder metering and withdrawal unit;

FIG. 14*a* is a side view of a fluidized bed with several of the powder metering and withdrawal units of FIG. 12 mounted on a sliding bar;

FIG. 14*b* is a partial cross section of the fluidized bed of FIG. 14*a;*

FIG. 15*a* is a side view of a fluidized bed with a drive mechanism attached to the sliding bar for changing the powder metering and withdrawal units;

FIG. 15*b* shows a cross sectional view of the fluidized bed of FIG. 15*a;*

FIG. 16*a* shows a cross section of an embodiment of a powder dispensing apparatus similar to that shown in FIGS. 11*a* and 11*b* but including a disk-on-bar powder metering and withdrawal device shown in FIG. 14*b* attached at the powder dispensing unit to the top plate;

FIG. 16*b* is a view along arrow A of FIG. 16*a;*

FIG. 17*a* is a cross-sectional view of an embodiment of a non-rotating, porous and single-cylinder fluidized bed with alternating air injection and releasing and with disk-on-bar powder metering and withdrawal device attached to the top plate;

FIG. 17*b* is a horizontal cross-sectional view of the device of FIG. 17*a;*

FIG. 18*a* is a cross-sectional view of an embodiment of a horizontal, rotating, porous and double-cylinder fluidized bed with alternating air injection and releasing and with disk-on-bar powder metering and withdrawal device attached to the end plate;

FIG. 18*b* is an end view of the device along arrow A of FIG. 18*a*; and

Figure 19:
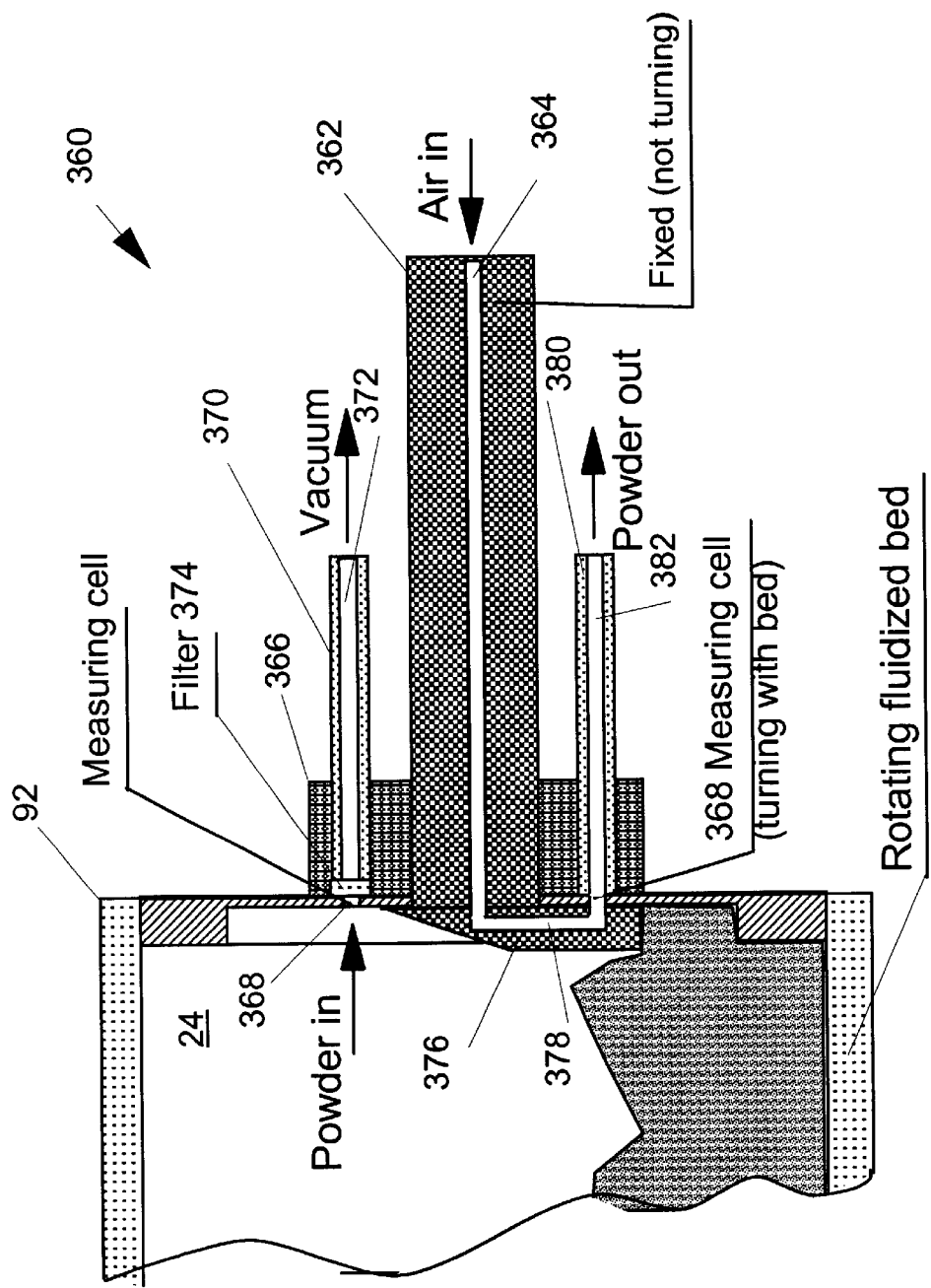

FIG. 19 is a cross section of another embodiment of a single dose metering and withdrawal device attached to a fluidized bed for dose by dose metering and withdrawal.

DETAILED DESCRIPTION OF THE INVENTION

The present invention provides improved fluidized bed devices for delivery of metered amounts of ultrafine particles. The fluidized bed devices disclosed herein provide a more uniform suspension of ultrafine particles in the fluidized bed, giving a more constant bed suspension density which allows a steady stream of particles to be withdrawn from the fluidized bed. When timed (controlled), this steady stream of powder flow can provide a controlled quantity of the powder into given containers such as for drug packaging. Alternatively, if the receptacle volume is fixed, the withdrawal quantity can also be controlled by allowing the receptacle to be completely filled.

FIG. 1 shows a cross sectional view of a fluidized bed at 20 constructed in accordance with the present invention which includes a housing 22 defining an enclosure 24 containing particles 26 to be dispensed from the fluidized bed. A gas distributor box 28 is attached to the housing 22 along a porous bottom wall (gas distributor) 30 of housing 22 and includes a gas inlet 32. An air outlet 36 is located in a top wall 34 of housing 22. It will be understood that gases other than air may be used so long as they are chemically inert in the presence of the powder particles. Two powder metering and withdrawal units 40 and 40' are located in a side-wall 42 of housing 22 for powder withdrawal, unit 40 being for powder withdrawal from the top dilute phase region and unit 40' being for powder withdrawal from the bottom dense phase region of the fluidized powder, the boundary between the top dilute phase and the lower dense phase region being shown by line 46. The powder withdrawal port may also be located in the bottom plate (not shown) within the distributor box 28. Side wall 42 includes holes 48 and the powder metering and withdrawal units 40, 40' include a powder collection port 50 shown as an annular disc having a central hole 52 in registration with hole 48. The hole or receptacle 52 has a known volume into which the particles 26 collect during dispensing from the fluidized bed. Port 50 includes a locking mechanism (not shown) to allow the metering units 40, 40' to be attached to, or detached from, the side wall 42.

Figure 2:
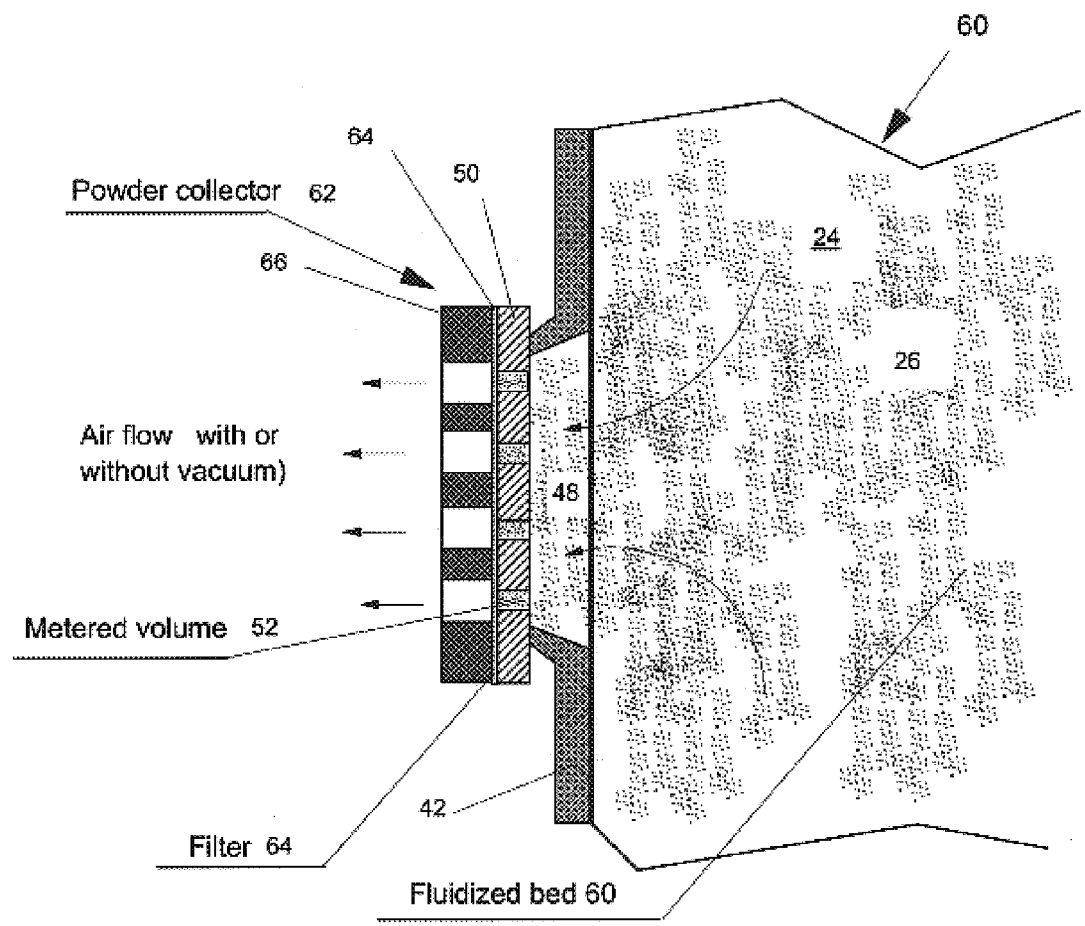

FIG. 2 shows a section of a fluidized bed 60 similar to bed 20 but with a powder metering and withdrawal unit 62 including a porous filter 64 located behind the collection port 50. The powder dispensing can be assisted or enhanced by airflow from the enclosure 24 through holes 48 and 52 and through filter 64. In addition, a vacuum port 66 may form part of the metering/withdrawal unit 62 being attached to the outer surface of filter 64 so that a vacuum can be applied from the back of the powder metering/withdrawal unit 62.

It is important to provide a steady supply of gas-solid suspension in the fluidized bed 20 or 60. This can normally be achieved in any fluidized bed, but may be difficult for some fluidized beds especially for those containing cohesive Geldart C powders, since there may be several problems such as solids entrainment, solids attachment on the wall, variable solids inventory due to the above-mentioned two problems, particle agglomeration, channeling, and dead zones. Difficulty also further increases with the decrease of the amount of particles to be withdrawn from the bed. Therefore, certain additional measures preferably should be taken. In particular, the present invention is particularly suited for the dispensing and metering of extremely small quantity (1 $\mu$g–100 mg) of fine Geldart group C powders. As discussed above, these powders are very cohesive and tend to form agglomerates which makes it very difficult to fluidize and handle them. The requirement of small quantities of these types of powder in many applications presents another challenge in respect of accuracy of the amounts dispensed. In order to ensure a good and steady gas-solid suspension for Geldart C powder, the above mentioned (six) problems should be properly addressed. Additionally and optionally, the following measures may be taken to help ensure the accurate dispensing and metering of the small quantity of ultrafine cohesive powders. However, the use of the present invention is not limited to addressing the above six issues, but can also provide solutions in other applications such as addition and removal of fluid along a fluidized bed reactor.

Many of the problems referred to above may be overcome using fluidized beds with porous walls that have a porosity sufficiently small to prevent significant loss of particles through the walls. FIGS. 3*a* and 3*b* show a porous fluidized bed at 70 having a rectangular housing 71 with surrounding walls 72 which are porous and a top plate 74 which may also be porous and/or has an air exit port. The porous bottom plate 76 is used as inlet for primary fluidizing air from the gas distributor box 78 and the top plate 74 and possibly part or all of the porous walls 72 for air outlets. Periodical back air-flow can be used to purge the porous walls 72 and 74 and to blow off the solids accumulation on the walls so that severe solid accumulation is prevented. The use of the porous top plate and surrounding walls as air outlets also reduces the chances of solid entrainment through any open exit such as the exit port 86, thus giving the benefit of no solids loss with the air exhaust.

Porosity of the bottom plates 30, 76 in FIGS. 1 and 3*a*, 3*b* may be achieved by drilling a number of holes in the distributor plate of distributor box 28 and 78 adjacent to the bottom plate 30 and 76, aligning two layers of solid materials with holes and meshes sandwiched in between. In the fluidized bed 70 of FIGS. 3*a* and 3*b* the surrounding walls 72 and the top plate 74 may be made using porous materials such as sintered metals, solid materials with micro-holes, or two layers of solid materials with holes and meshes sandwiched in between. In the case of fluidized beds for handling very small particles (e.g. Group C size particles) which is the particle size for which the present invention is particularly suited it is important that the porosity (size of the holes or pores) of the walls be correlated with the particle size so that the pore size is small enough to allow the majority of particles to be retained in the fluidized bed. The porous materials may be hard or rigid materials suitable for structural purposes. If not, solid frames may be used to support the porous structure. One of the typical porous materials used for the present invention is sintered metals, which is very strong and thus can be used to perform structural functions as well.

In the fluidized bed illustrated in FIGS. 3*a* and 3*b*, primary fluidizing fluid such as air is injected as indicated by the arrow 82 through port 80 into the bottom of distribution chamber 78 which then passes through the bottom wall 76 to fluidize solid particles such as a fine powder to form the fluidized bed. Additional fluidizing air different from the primary fluidizing fluid may be injected into the bed 70 through one or more of the walls 72 or top plate 74 or alternatively air may be drawn out or ejected through the porous walls 72 or top plate 74 as indicated by the arrow 84.

Optionally, a primary air outlet 86 can be included in top plate 74 and/or the surrounding walls 72 (the latter embodiment not shown in FIG. 3).

Figure 4A:
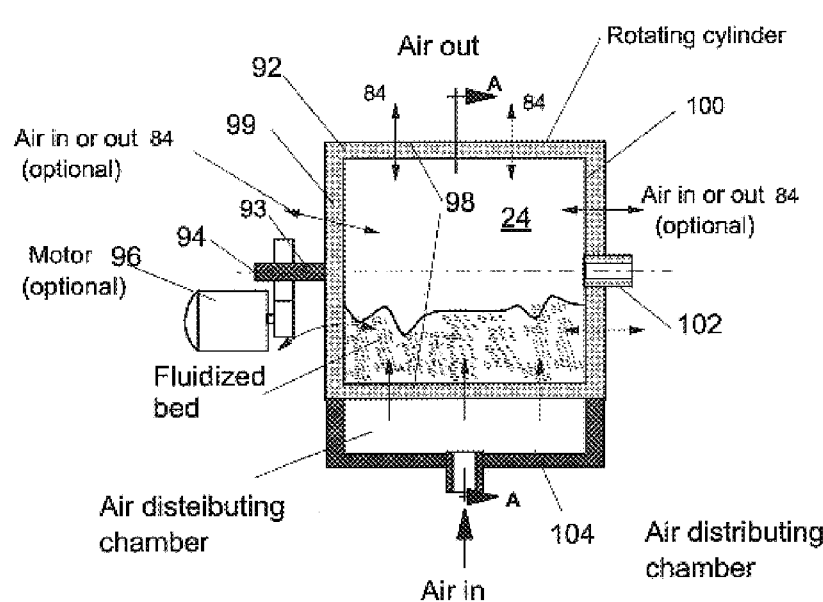

FIG. 4a shows an embodiment of porous fluidized bed which is constructed for rotation during operation. Fluidized bed 90 includes a cylindrical housing 92 (FIG. 4a) having a cylindrical axis 94 with the cylindrical housing oriented horizontally. Housing 92 is adapted to be rotated about the horizontal axis 94 by a motor 96 coupled to a shaft 93 extending along axis 94 from the housing 92. Cylindrical housing 92 includes a porous cylinder wall 98, one porous end plate 99 and another porous end plate 100, and a powder metering/withdrawal unit 102 located in plate 100. A gas distribution box or manifold 104 is positioned adjacent to the porous cylindrical wall 98. Manifold 104 remains stationary while cylindrical housing 92 is rotated about axis 94 and since cylindrical housing 92 is porous, the powder on the interior of the housing is constantly being fluidized. A similar design may be used but with the housing oriented vertically and driven by a gear motor about the vertical housing axis.

There are several significant benefits achieved by having the fluidized bed housing rotated. The first advantage is that the top part (main fluid exit) and the bottom part (primary fluidizing fluid inlet) of the cylindrical wall 98 are switched continuously during rotation. At any given time at least part of the cylindrical wall 98 forms both inlet for primary fluidizing fluid to form the bed as indicated by the arrows at the bottom and the primary outlet for fluidizing fluid at the top. In this case, particles that may be adhering to wall 98 are blown away from the wall by the incoming fluid when that part of the wall is rotated into a position adjacent to manifold 104.

Secondly, the relative movement between regions of the fluidized bed and the gas inlet provide a periodic back purge to a greater area of the bed, so that dead zones are effectively reduced or eliminated. Thirdly, the rotation of housing 92 creates additional agitation to the fluidized bed, and thus helps to break up agglomerates and prevent severe channeling of the fluidized bed.

With the prior art rotating fluidized beds, air is forced to leave the bed axially along the horizontal axis of rotation. The rotating fluidized beds disclosed herein are preferably operated at low rates of rotation, for example 60 revolutions per minute (RPM) has been found to be effective, whereas the centrifugal beds of the prior art rotate much faster since they need to use the rotating action to create large pseudo-gravitational forces.

If the fluidized bed is designed so that a significant portion or substantially all the fluidizing gas must leave the bed through the porous walls of the housing, there will be little or no particle loss. Even when there is an exit port provided, the fact some gas leaves the housing through the side and top porous walls will reduce the gas velocity through the outlet port and thereby reduce the chances of particle loss.

Powder withdrawal can be facilitated through one or more withdrawal port at the walls of the fluidized bed, which can be horizontal, vertical or of any other geometry. Fluidized bed 90 in FIG. 4a shows one option of having the withdrawal port 102 on the end plate 100 of the horizontal cylindrical and porous fluidized bed, but it will be understood that it may be placed in other locations on the housing.

Figures 3A, 3B:
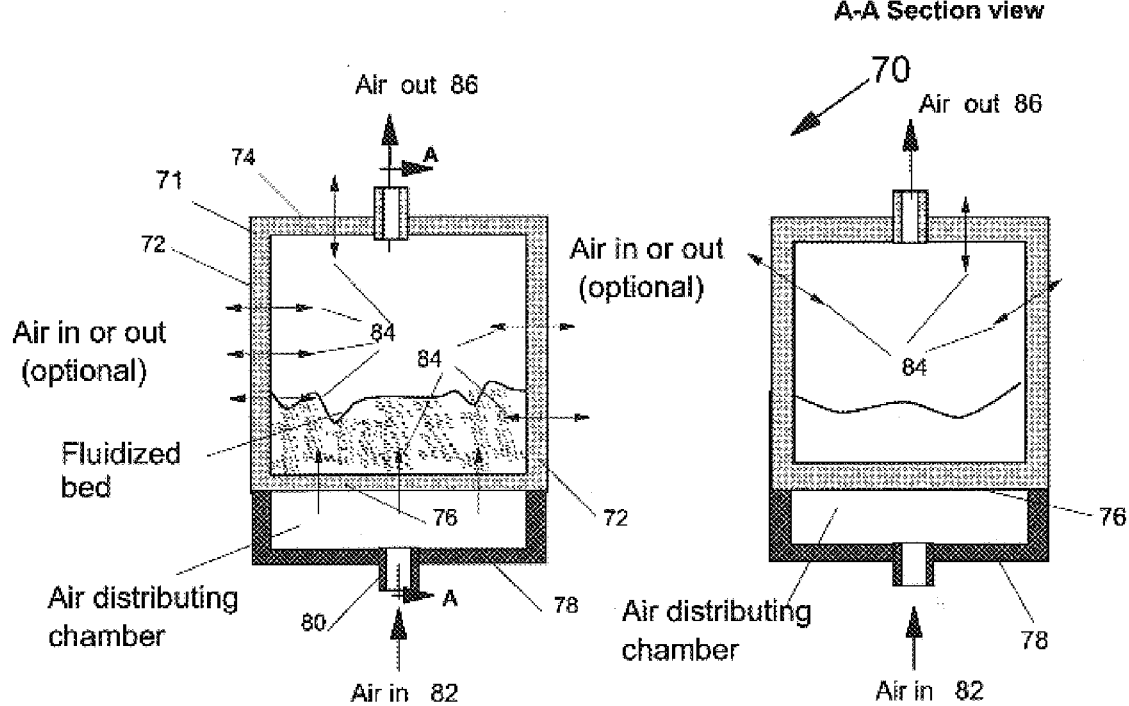
Figure 4B:
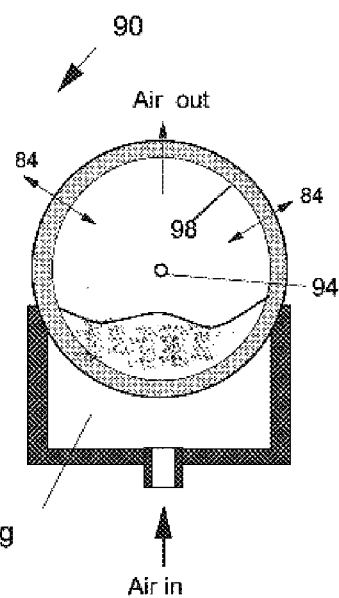
Figure 5:
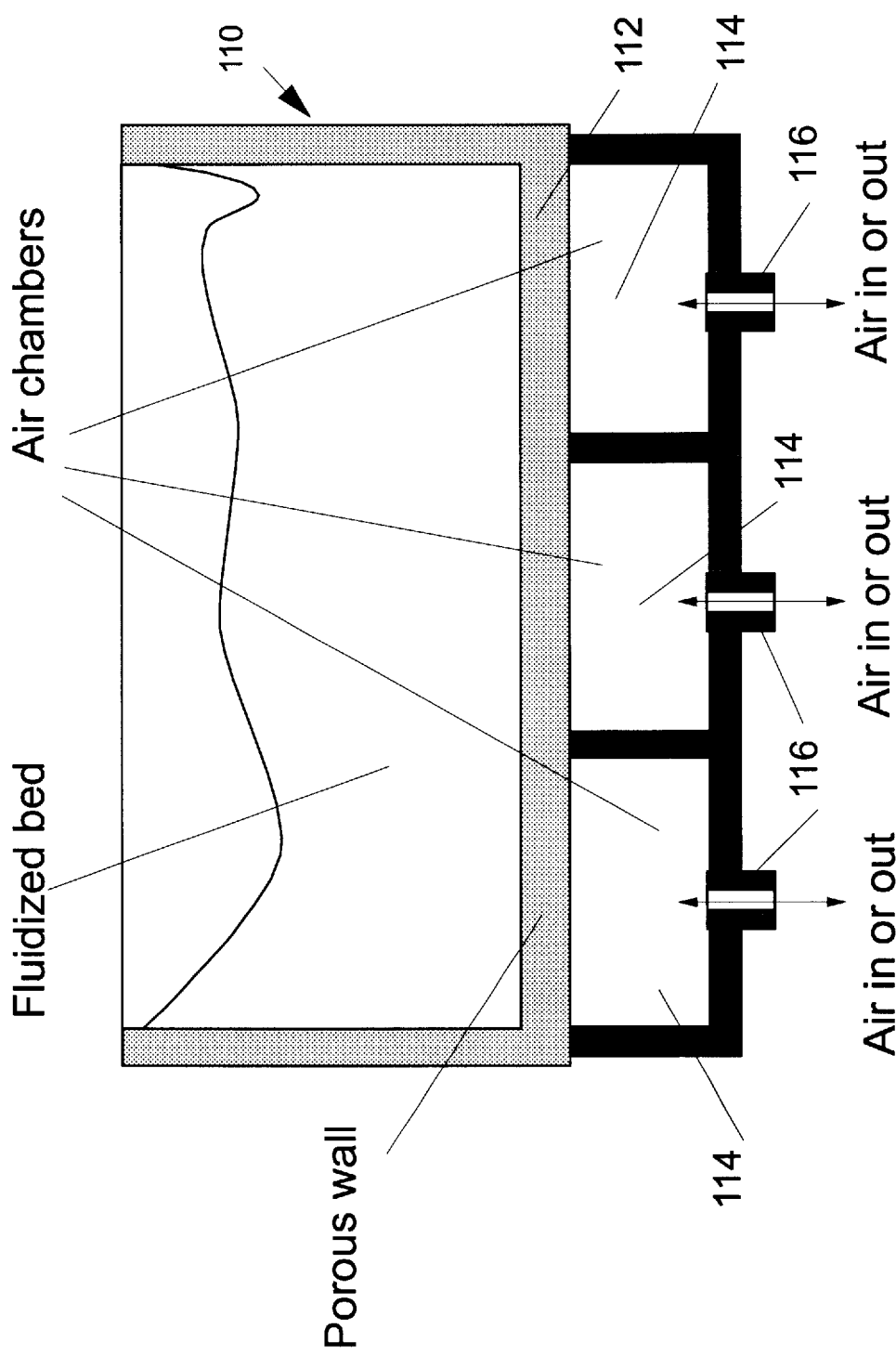

Fluidizing gas may be selectively injected or removed at selected rates through localized areas of the top plate 74 and surrounding side walls 72 as exemplified by the bidirectional arrows shown in FIGS. 3a and 3b so that air flow into and out of housing 71 is not restricted to the area adjacent to the manifold 78. Similarly, the bidirectional arrows through the porous cylindrical wall 98 and the porous end walls 99 and 100 of housing 92 in FIG. 4 indicate that bidirectional air flow into and out of the housing 92 is not limited to the portions of cylinder wall 98 adjacent to the gas manifold 104. Referring to FIG. 5, as an example, a gas inlet manifold 110 positioned against porous wall 112 of the bed housing is formed with three separate compartments 114 into each of which fluid may be selectively injected or removed from each of the compartments through the fluid ports 116 as indicated by the arrows. Such manifolds may extend all around the top and surrounding walls of bed 70 and the full periphery of the cylindrical plus side housing walls for bed 90, or they may extend only partially around the chamber or bed 70 or 90. The dimensions of the different compartments of the manifold need not be the same but may be different depending upon the application of the fluidized bed and the fluidizing gas requirements. Furthermore the shape and orientation of the manifolds need not be rectangular nor need they extend axially/horizontally along the full length of the bed housing.

In another embodiment of the manifold, discrete injector or withdrawal nozzles or pipes may be used (not shown). The nozzles may be mounted to be moveable so that the location of each of the nozzles may be varied if desired.

Figures 6A, 6B:
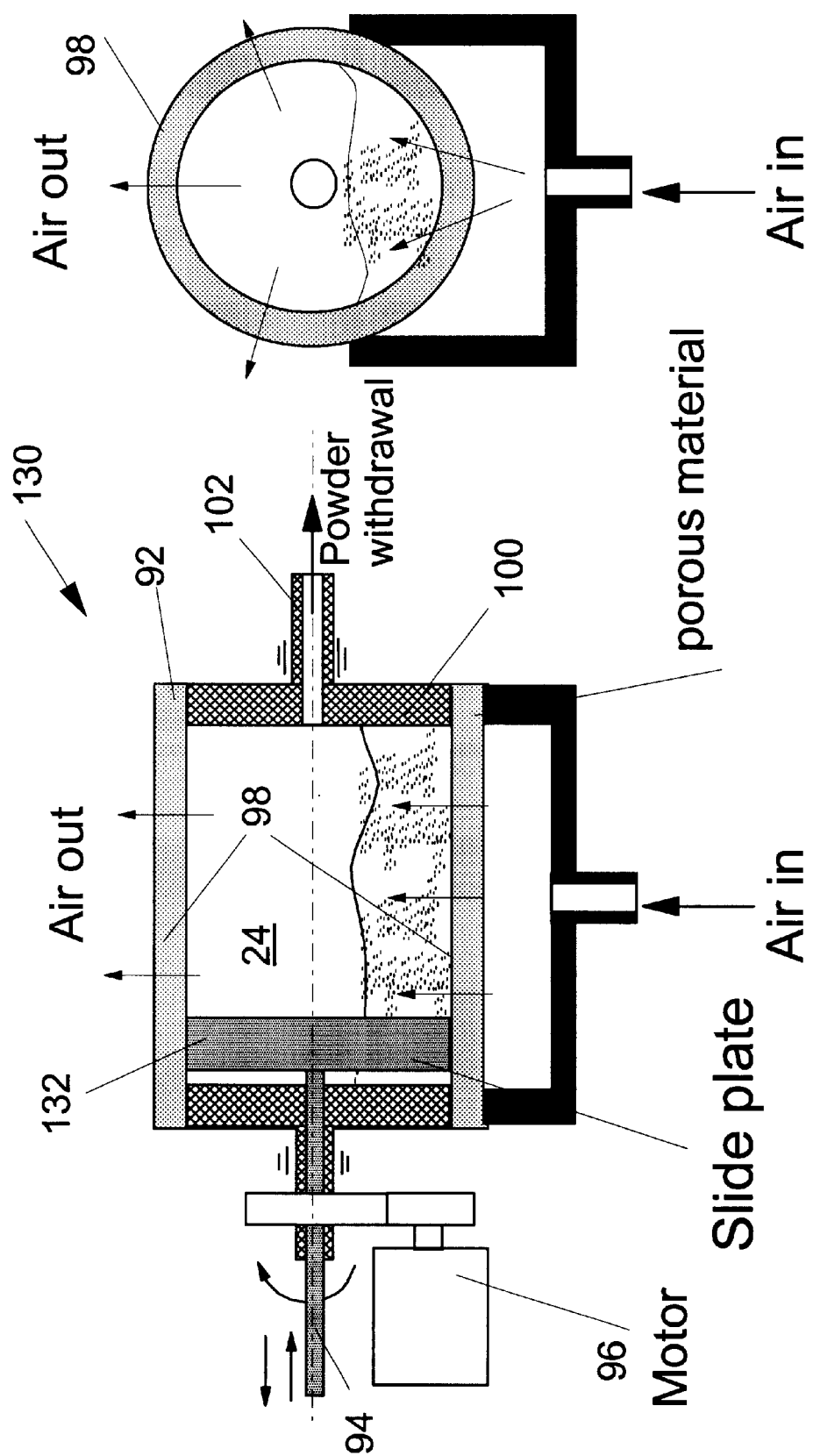

Referring now to FIG. 6, a variable-volume porous fluidized bed is shown generally at 130 which includes a movable wall 132 located in cylindrical housing 92 which can be moved back and forth along the cylindrical axis 94 of housing 92 for reducing or increasing the volume of enclosure 24 during the course of operation to provide a relatively consistent gas-solid suspension when the fluidized bed dispenser is in batch operation mode. As particles are withdrawn from the bed, the amount of particles left in the bed will gradually decrease and so will the suspension density. Without volume compensation, particle withdrawal, for example, would require longer withdrawal times to dispense the same amount of material. Such reduction of the bed volume will compensate for the reduction of the particle quantity, so that the gas-solid suspension density can be maintained relatively constant. The volume change is done in a controlled manner such that the decreased volume just compensates for the reduced particle quantity.

Figures 7A, 7B:
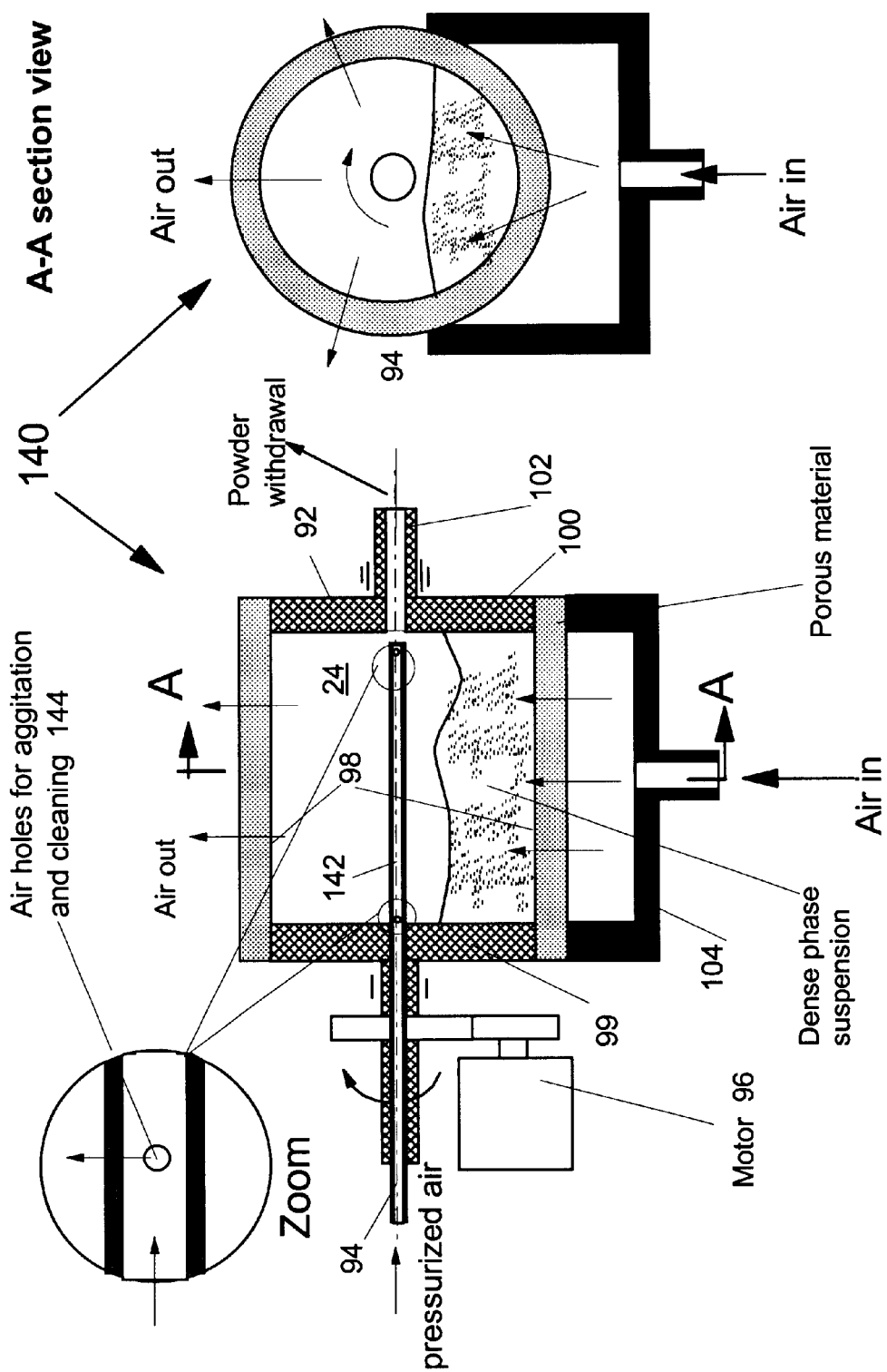

FIGS. 7a and 7b illustrate a fluidized bed at 140 modified to have additional gas injection directly into the fluidized bed to provide additional agitation to and to mobilize the fluidized bed, to create preferred gas flow patterns that make the particles/agglomerates to impact among themselves, and to provide purging to the inside of the withdrawal port and dead corners of the bed. In all cases, the opening for the injection gas should be small enough to create a high velocity nozzle flow, to make the gas agitation more effective. In bed 140 shown in FIG. 7 a horizontal tube 142 with holes 144 spaced along the tube 142 is inserted along the rotational axis 94 of housing 92. The air injection not only provides additional agitation to the bed, but also cleans the edges between the cylindrical housing 92 and the two end plates 99 and 100. Since the fluidized bed housing 92 itself is rotating, the nozzle gas injection actually "moves" inside the bed relative to the fluidized particles so that it provides agitation periodically to different regions of the bed. This can also effectively reduce or prevent dead zones from arising. It is understood that although there are two holes shown in FIG. 7, there may be more or only one hole as may be required.

The end of tube 142 is positioned next to the inside of the withdrawal port 102. Occasionally, particles may accumulate just inside the withdrawal port 102 which can influence the metering speed and accuracy. In this case, this small purge gas can be applied through an end hole facing the powder metering port (not shown in the figure) to blow off the accumulations. Such purging is best done between two consecutive metering/withdrawals or when the new withdrawal units are loaded into the fluidized bed, since purging, if strong enough, may also blow off particles inside the charged cavities and/or create a localized strong gas flow pattern that prevent or reduce the amount of the gas-solid suspension (from) flowing into the withdrawal region. Alternatively, the horizontal tube 142 may be retractable, so that it is retracted away from the withdrawal port but maintains other regions of the fluidized bed aerated.

Figure 8:
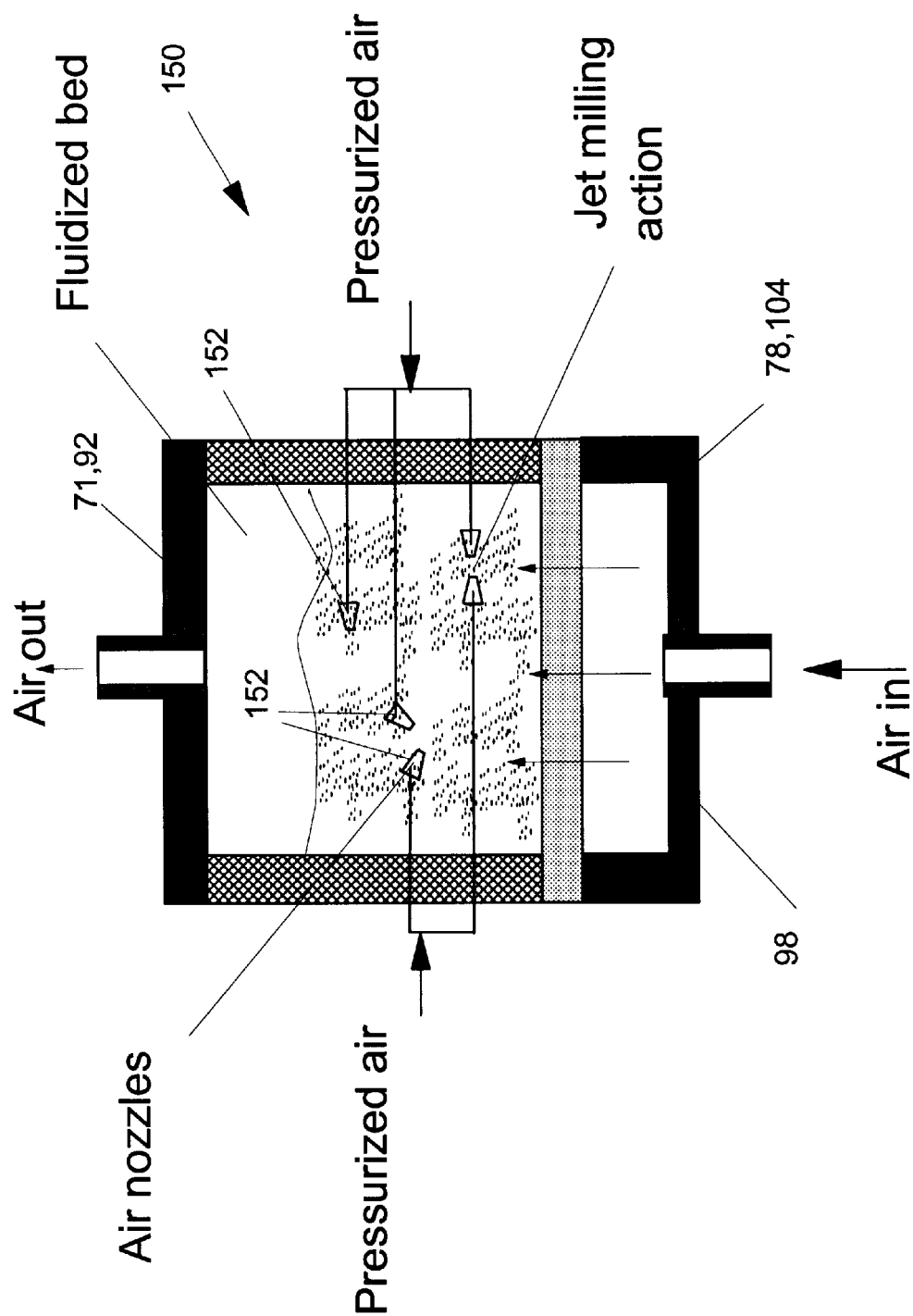

FIG. 8 shows another embodiment of a fluidized bed at 150 having several nozzles 152 distributed in different regions of the bed. Two or more nozzles 152 can be placed facing each other to create a flow pattern for the particles to collide with each other producing a jet milling action. In addition, one or more portions of the tubes extending from the chamber wall to any nozzle 152 may be flexible tubing so that with the proper combination of the tube materials (e.g. rubber) and gas flow rates the nozzle will "dance" randomly due to the air flow from the flexible tube. This produces yet additional agitation to the fluidized bed, and thus reduces or eliminates the problems of particle agglomeration, dead zones and channelling.

Figure 9:
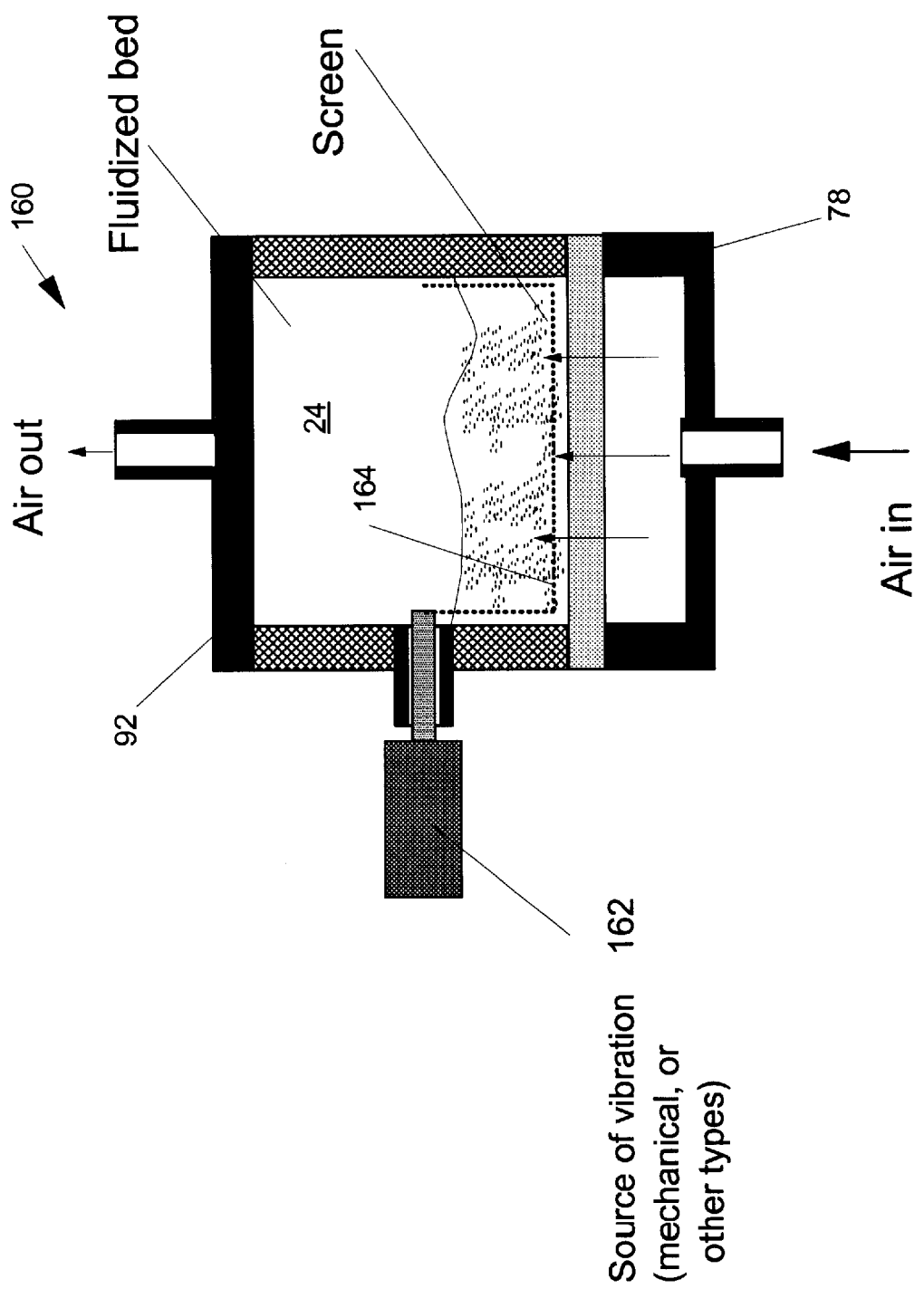
Figure 10:
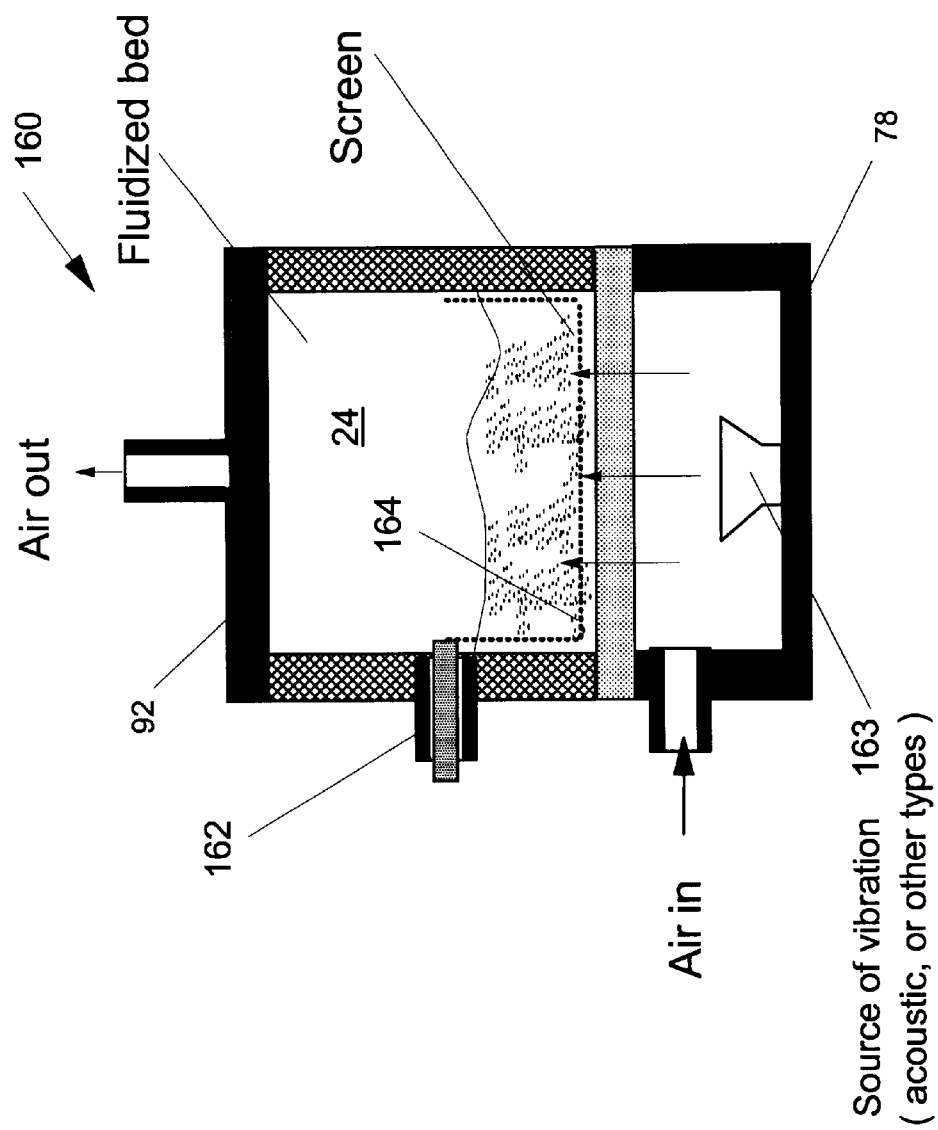

FIG. 9 illustrates part of a fluidized bed 160 adapted so that mechanical, acoustic or ultrasonic vibration can be applied to the fluidized bed to provide additional agitation. An external source of vibration 162 is coupled to housing 92 in order to generate and pass mechanical, acoustic and/or ultrasonic vibrational energy to the powder inside the housing. Such vibration will be transferred onto the bed wall and/or to some mechanical parts (e.g., preferably a mesh 164 with rigid frame) located in enclosure 24. The bed wall and/or the frame inside the bed then vibrates at very high frequency, providing additional agitation to break the powder agglomerates. FIG. 10 shows an alternative embodiment in which a vibrational source 163 is positioned in the gas manifold 78.

Adding larger beads (for example, 4–20 mm diameter stainless steel balls and/or 5–20 mm diameter marbles, but beads of larger or smaller diameter and of other materials may be used) to the rotating fluidized bed can provide further additional agitation for breakup of particle agglomerates, prevention of dead zones and channelling.

Figures 11A, 11B:
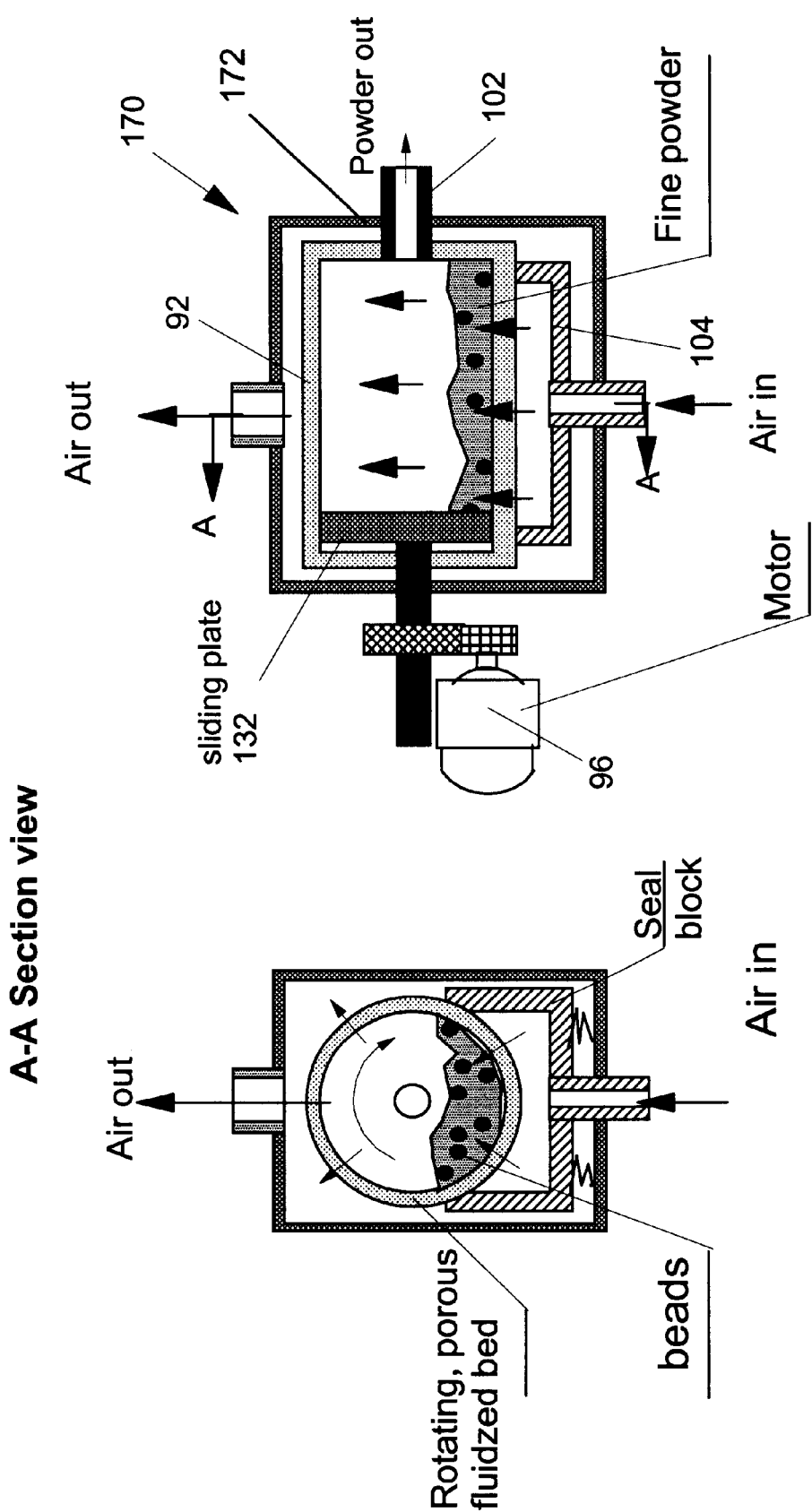
Figures 12A, 12B:
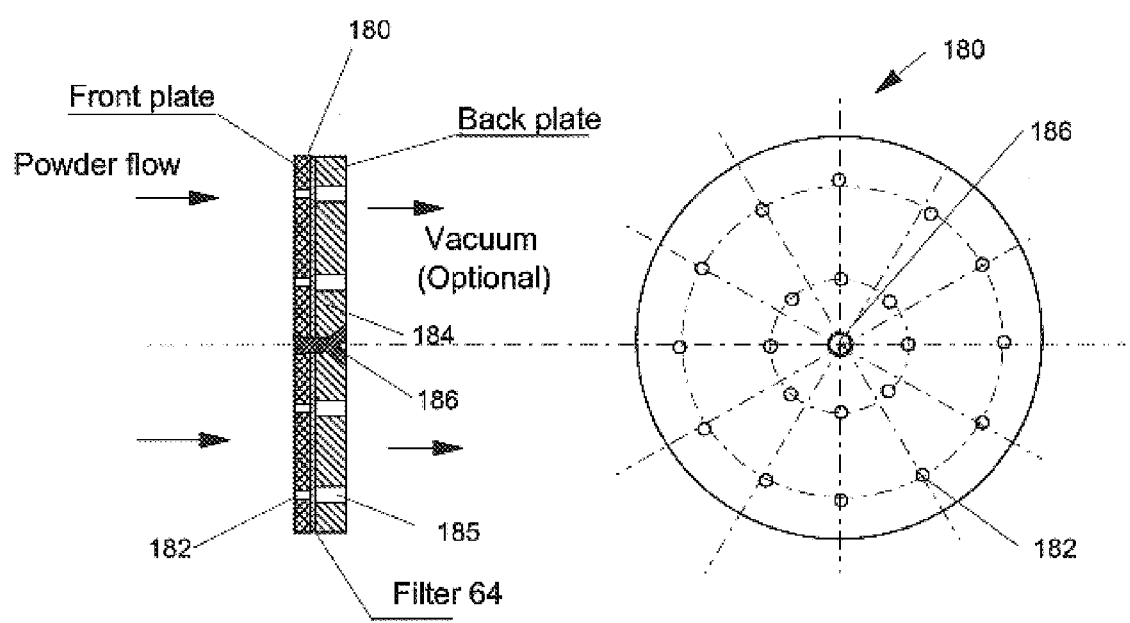

FIGS. 11a and 11b show a fluidized bed 170 including most of the important features discussed above, a variable-volume, rotating and porous fluidized bed dispenser with large beads inside the housing, which is enclosed in a sealed case 172 for practical use.

It will be understood that while the above description has been exemplified with the gas-solid fluidized bed, the same inventive concepts may also be applied to liquid-solid and gas-liquid-solid three-phase fluidized beds. In addition, more than one powder metering/dispensing unit may be attached to the housing so that powder can be dispensed from multiple locations in the housing.

Figures 13A, 13B:
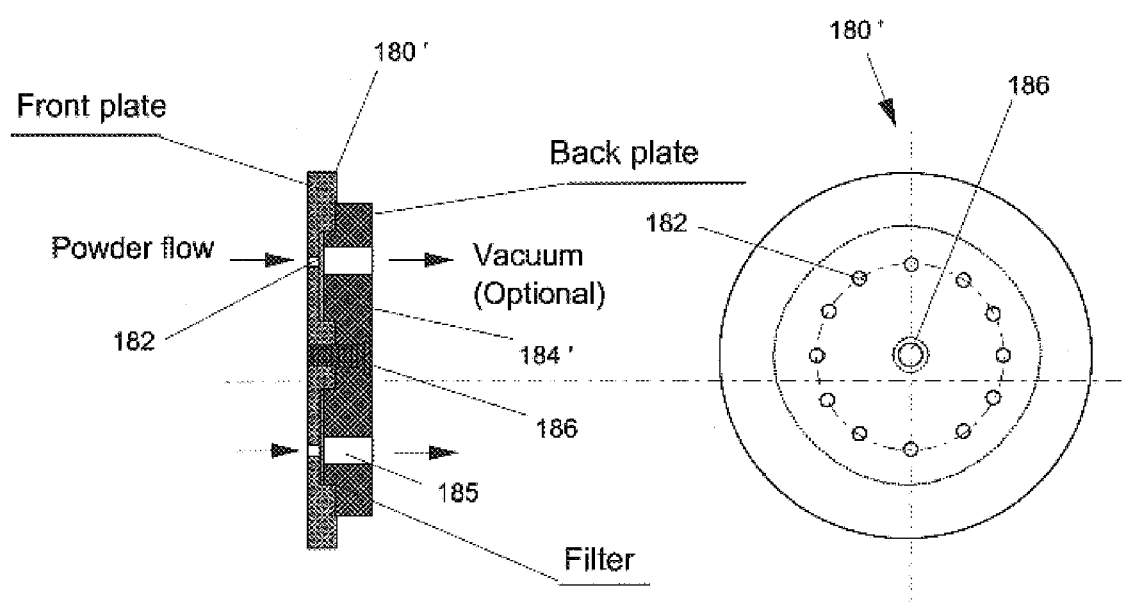

FIGS. 12a, 12b, 13a and 13b illustrate different preferred embodiments of the powder metering/dispensing units which are mounted on the fluidized bed housings in flow communication with the interior of the housings. The powder metering/dispensing units comprise a powder collector which includes a front blister plate (or circular disk as shown) 180 having one or more cavities or holes 182 in the disks with the cavities having pre-selected volumes which are used for collecting the powder from the fluidized bed. Each blister disk 180, also referred to as a blister cell, is mounted on a perforated support plate 184 using a screw 186 with the perforations 185 in plate 184 in registration with holes 182 in the blister plate 180 so that air can flow through the blister plate when it is mounted on the fluidized bed. Filter 64 (FIG. 12b) is sandwiched between the blister plate 182 and support plate 184 acts as a porous barrier to prevent particles being drawn through the holes 185 while at the same time allowing air flow by applying a pressure difference on either side of the plate 184/blister plate 180, or by a vacuum on the other side of plate 184 on the outside of the chamber. The plate 184 is mounted with the blister disk 180 in registration with aperture 48 in the fluidized bed (FIG. 14b) with the cavities 182 facing the interior chamber 24 of the fluidized bed. The blister disks 180 attached to support plate 184 is first mounted on the bar strip 194, which is then detachably removable from the fluidized bed housing. Particles inside the small cavities 182 are then either kept there for future use (if the purpose of metering is to dispense the powder just into those cavities) or removed (for example by being blown out) from the cavities and transferred to the desired container. FIGS. 13a and 13b illustrate an alternative disk blister cell 180', with the areas of the disk in the vicinity around the blister holes 182 being partially thinned to reduce the metering volume, while maintaining the mechanical strength by keeping enough thickness for the rest of the front disk 180'.

While the blister disks of FIGS. 12 and 13 are shown mounted on support or back plates 184 (184'), it will be understood that the support plate 184 could be used itself as the powder collector as long as the cavities 185 located in it are of the desired volume and do not penetrate right through the plate.

Figures 14A, 14B:
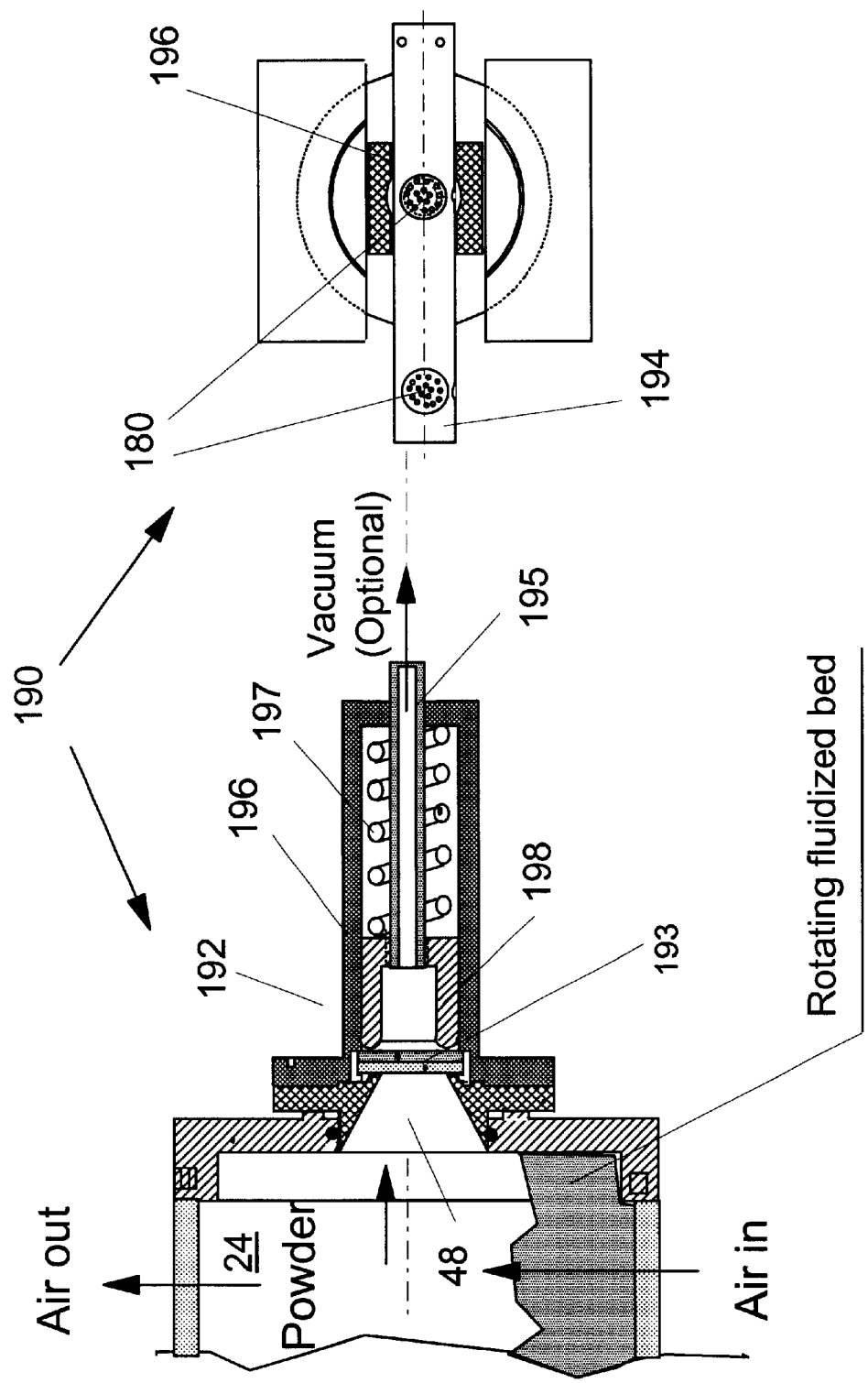

FIGS. 14a and 14b show partially a fluidized bed 190 having a powder metering and withdrawal unit 192 which includes a blister cell bar strip 194 for mounting thereon blister disks 180. FIG. 14a shows a bar strip 194 having two circular disks 180 mounted on the strip along its length. Referring to FIG. 14b, powder withdrawal unit 192 includes a slot 193 at the front that allows the insertion of the bar strip 194, an inner tube 195 in communication with chamber 24 in the housing, and an outer tube 196 concentric with inner tube 195 and a spring 197 around tube 195 encased in tube 196 pressing a spacer 198. The slot 193 is facing the opening on one side of the fluidized bed into which strip 194 can be fitted. The purpose of the spring 197 is, through the spacer 198, to press the bar strip 194 tightly against the side plate of the fluidized bed so that a good seal is maintained. The inner tube 195 is used for outflow air to enhance the powder withdrawal process, which may be enabled by higher pressure inside the fluidized bed or a vacuum at the outside. Strip 194 is also perforated at those positions where the support plates 184 are mounted so that suction through the strips 194, support plates 184 and blister disks 180 can be obtained for suction assisted filing of the cavities 182.

Referring again to FIGS. 14a and 14b during the metering, one disk blister disk 180 is exposed to the fluidized bed for powder withdrawal. After the holes or cavities 182 of the disk 180 are filled, either by controlling the withdrawal time or by allowing the cavities to be filled up, the strip 194 is moved in the groove a sufficient distance to move the charged disk 180 away from the fluidized bed 190 whereupon disk 180 can be removed from strip 194. At the same time another disk 180 can either be attached to strip 194 at the same position and reinserted into position adjacent to aperture 48 in the withdrawal position or strip 194 can be slid along to align another disk 180 at another position on the strip 194 with opening 48.

Preferably, the blister disks 180 are porous (holes 182 extending right through the disk) so that gas can flow through the disks. This gas flow helps push or suck powder into the cavities 182. Such gas flow not only accelerates the filling, but also provides increased accuracy since the "driving force" is larger and more steady. Such gas flow can be created by a pressure difference, which can be realized by either applying vacuum suction from the back or increasing the pressure inside the fluidized bed, or both. The gas passage in this case may be a straight hole, produced by making two thin disks (front and back) with the same number of holes in each disk and with their centers lined up to each other. Between the two disks, a thin layer of porous material (filter paper, membrane materials etc.) is used, creating a cavity on each side of the disk, but it is only the front side 182 that is used as the blister cell. Preferably, the holes on the support plate 184 are made larger than those of the blister cell to reduce the resistance to air flow.

It will be understood that while the above description has been exemplified with the disk shaped metering unit and with cylindrical cavities, other suitable designs with suitable powder receptacles can also be used to meter and collect the powder from the fluidized bed. For example, a bar strip similar to 194 shown in FIG. 14a can be made into a powder metering/collecting unit, by having a blister bar with many blister cells coupled with a supporting bar on the back.

Figures 15A, 15B:
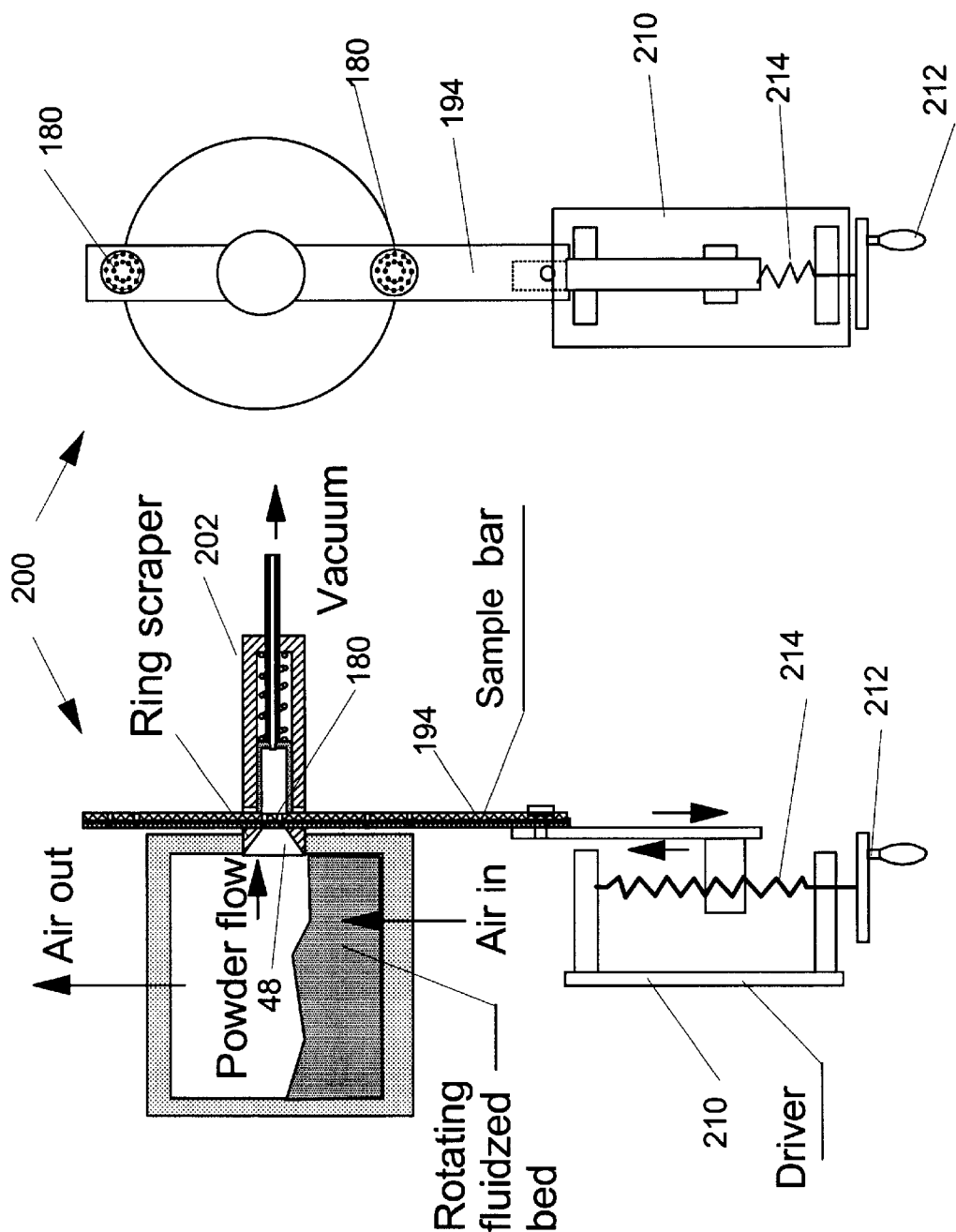

FIGS. 15a and 15b show two views of a fluidized bed 200 with associated metering and dispensing unit 202 attached at the aperture 48 and including a drive mechanism 210 attached to the support strip 194 for positioning a series of blister disks 180 at the dispensing unit. Drive mechanism 210 is a manual feed comprising a hand crank 212 driving a screw 214 which drives strip 194.

Figures 16A, 16B:
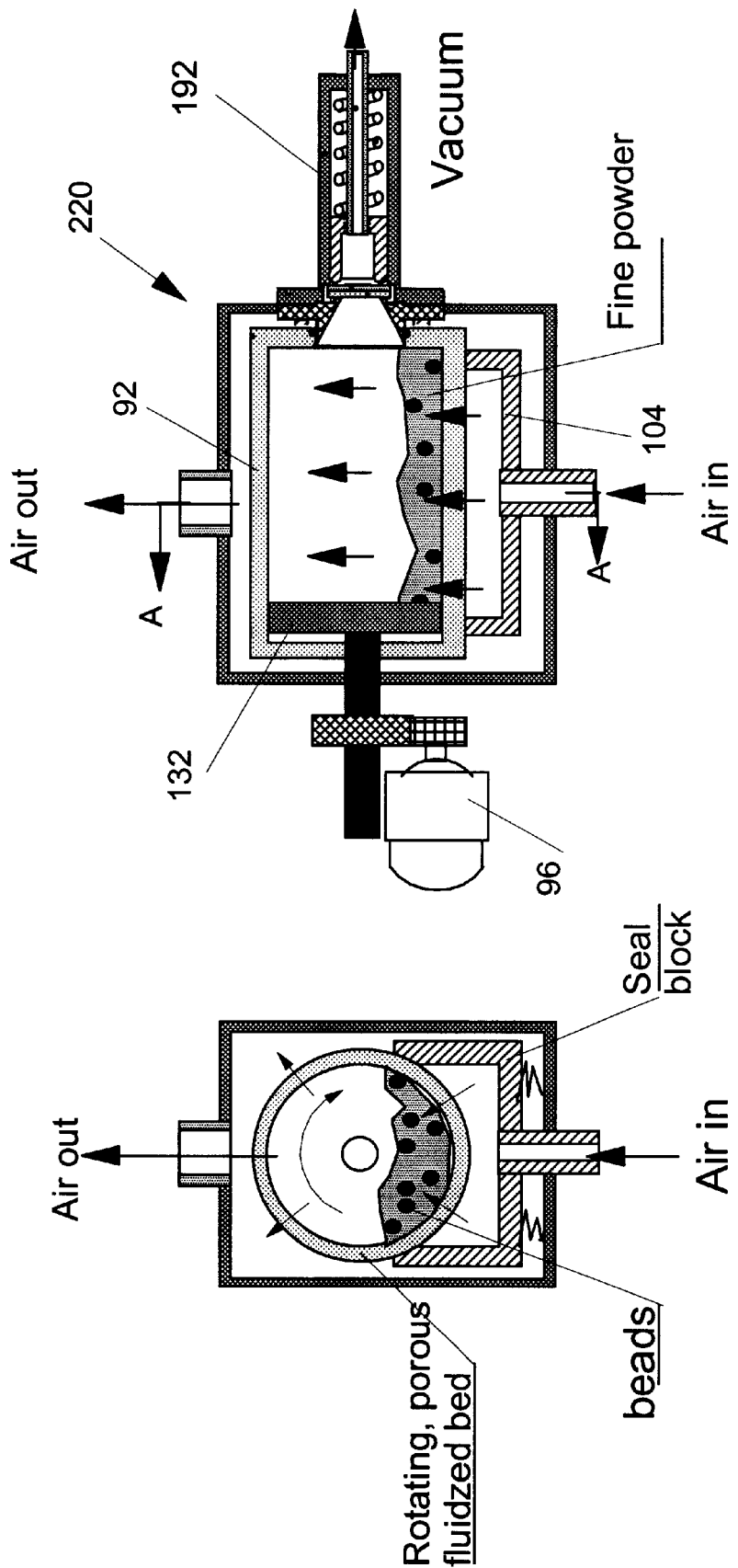

FIGS. 16a and 16b show a dispensing apparatus 220 similar to apparatus 170 in FIGS. 11a and 11b but apparatus 220 includes the powder metering/withdrawal unit 192 of FIG. 14b.

Figure 17B:
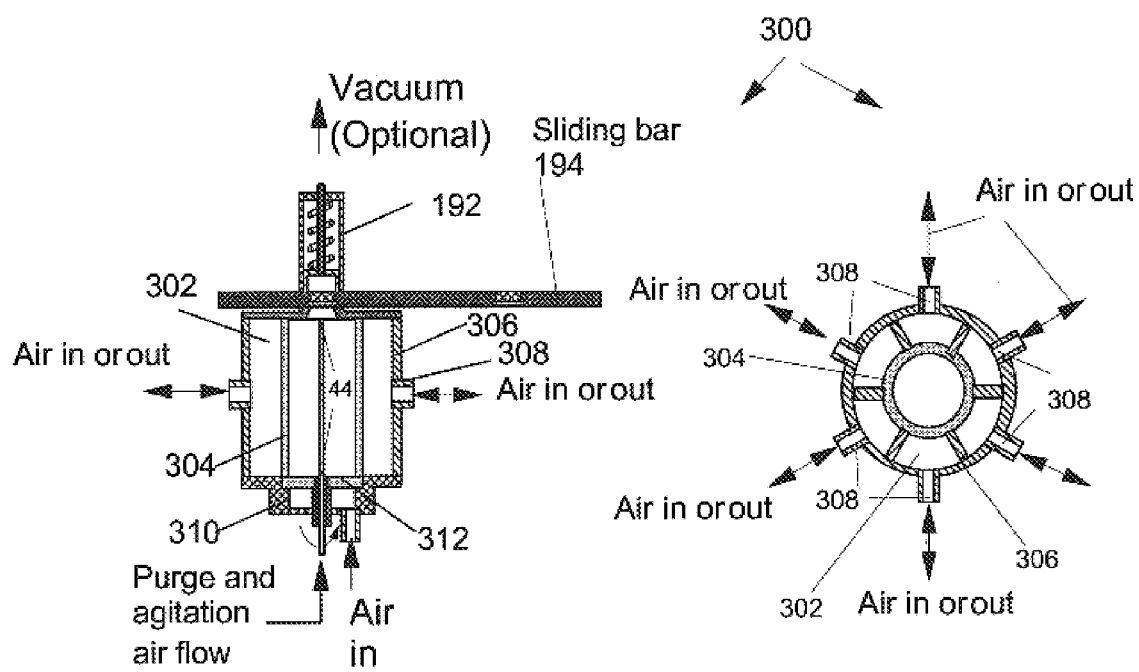

FIGS. 17a and 17b illustrate an alternative fluidized bed shown generally at 300. This is a porous, but non-rotating, fluidized bed. In this unit, two cylinders 304 and 306 are used and placed concentrically, with their axes in the vertical direction (but can be horizontal). The inner cylinder 304 may be made of a porous Teflon tube and the outer cylinder 306 may be made of a non-porous Teflon tubing. Between the inner and outer cylinders six sealed chambers 302 are defined. Air can be forced into, and released from, the chambers 302 through six air ports 308 on the outer cylinder 306.

Periodic reversal of the airflow direction across the wall of inner cylinder 304 keeps the wall of cylinder 304 clear of significant particle accumulation while still providing enough area for air to leave. Referring to FIG. 17a, an air distributor box 310 for injection of air into cylinder 304 is located at one end of the concentric cylinders 304 and 306 and includes a porous Teflon plate 312 through which fluidization air is continuously injected. During operation air is being injected into two of the chambers 302 through the associated ports 308 and air is exiting four of the chambers (or alternatively air enters three and exits the other three chambers 302) through their associated ports 308. Solenoid valves (not shown) associated with each of the ports 308 are used to automatically switch the air flow direction into and out of the chambers 302. The powder withdrawal unit 192 is located at the opposite end of the concentric cylinders 304 and 306 and includes disk collection strip 194. Since fluidized bed 300 is non-rotating, a seal between the drum and disk collection strip 194 is better maintained so that it minimizes leaking through the sampling port. It also eliminates the air loss before entering the housing 304. Wear on the unit is also minimized since there is no rotation.

Figure 18B:
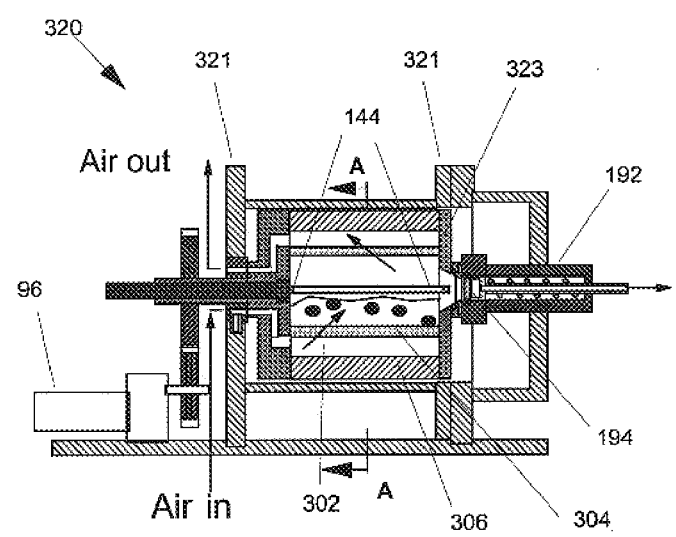
Figure 18A:
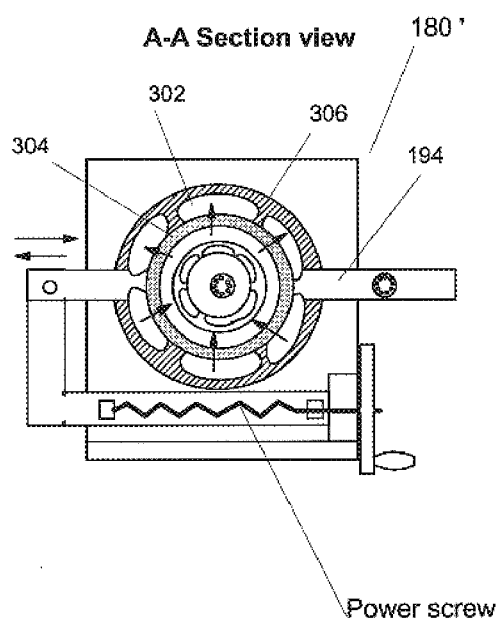

FIGS. 18a and 18b show a unit 320 that combines the features of the unit 220 shown in FIG. 16 (rotating, single cylinder) and the unit 300 shown in FIG. 17 (double-cylinders with sealed air in/out compartments). Essentially, the single cylinder arrangement (housing 92) in unit 220 plus the gas distributor box 104 are replaced by the rotating double-cylinder arrangement in unit 300, in the new unit 320. In a particular case, a concentric nonporous outer cylinder 306 is used to encase the inner porous cylinder 304 that houses the fluidized bed. The inner cylinder is a porous Teflon tube and the outer cylinder is a non-porous Teflon or stainless steel tubing. A gap is located between the inner and outer cylinders which defines six sealed chambers 302. Three (or two) chambers 302 located along the bottom may be used for air flow into the inner cylinder while the upper three (or four) chambers along the top may be used for air outflow from the inner cylinder.

Referring again to FIG. 18a, located on the left side of the double cylinders 304 and 306 is an end plate 322 which is glued to the end portion of these cylinders. The concentric double cylinders 306/304 with end plate 322 attached thereto are mounted in frame 321 for rotation by the rotational drive unit 96 while the end plate 322 which is mounted in frame 321 remains fixed with respect to the cylinders. The powder withdrawal/dispensing unit 192 is mounted on the other end plate 323 at the other end of the double cylinder which is attached to the double cylinder so that it rotates with the double cylinder. The powder withdrawal/dispensing unit 192 is rotatably mounted on the end plate so that as the end plate rotates with the double cylinder, dispensing unit 192 remains stationary and is supported by frame 321. Fluid injection and escape passageways are located in end plate 322 as indicated by the arrows so that under pressure air is forced into the bottom three (or two) chambers 302 while the air flows out from the top three (or four) chambers 302. At any moment, two (or three) of the sealed chambers 302 along the bottom of unit 320 are used as the air distributor for the air injection, while the other three (or four) sealed chambers along the top serve as the air exit for air releasing. When rotating the double cylinder together, the air injection and releasing compartments 302 alternate to form periodical airflow reversal across the inner cylinder wall, keeping the wall clear from significant particle accumulation while still providing enough area for air to flow through. The particle withdrawal unit 192 is located at the opposite end of the rotating housing to the air injection, with the powder withdrawal.

There are several practical benefits to use the double cylinder housing: the inner cylinder can be made from less strong materials such as the more fragile porous Teflon tubing since it does not rotate relative to the outer cylinder. Also because there is no rotating action between the two cylinders, leaking between the housing 304 and distributor chambers 302 are prevented. Erosion of both cylinders is also minimized since there is no relative rotation of the inner cylinder and only small touching area against the outer cylinder at the air distributor box.

FIG. 19 shows another embodiment of a powder metering and dispensing unit at 360 where single dosages of powder are dispensed one at a time. The metering/withdrawal port includes a central stationary air inlet tube 362 with a channel 364 down the center of the tube 362. On the rotating housing 92 a series of calibrated holes 368 in which the powder collects are disposed in a circle around the axis. A vacuum assisted powder loading mechanism 366 includes a tube 370 connected to a vacuum source with the tube 370 being fixed with respect to tube 362. Tube 370 includes a channel 372 and filter 374 is located in channel 372 having a gauge small enough so that no particles are pulled through the filter 374. When either (does either mean any of the holes?) hole 368 is aligned in registration with channel 372 powder is pulled into the hole 368. A guide 376 having a channel 378 is located on the inside of housing 92 and is fixed to tube 362 so it does not rotate. The powder outlet is defined by a tube 380 having a channel 382 which is fixed with respect to tube 362 with channel 382 radially spaced from channel 364 so that as housing 92 rotates holes 368 periodically align with channel 382 whereupon the powder collected when hole 368 was in registration with channel 372 is blown out through channel 382 under pressurized air since that particular hole is in flow communication with pressurized air injected into channel 364. Therefore, for each rotation of the housing 92 each hole 368 is filed with a pre-selected quantity of powder thereby dispensing powder in a continuous shot-by-shot manner.

As used herein, the term "comprising" is to be construed as being inclusive and open ended, and not exclusive.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. A fluidized bed for dispensing powders, comprising:
    a) a housing defining an enclosure for containing particulate matter, said housing including a fluid injection means for injecting a fluid into said enclosure for fluidizing particulate matter contained within said housing for forming a dilute phase alone or a dilute phase and a dense phase of fluidized powder in said housing; and
    b) volumetric metering means connected to said housing and in flow communication with said enclosure through an outlet passageway for withdrawing pre-selected amounts of said particulate matter from said housing.

2. The fluidized bed according to claim 1 including gas purging means in communication with said enclosure for removing particulate matter adhering to said housing.

3. The fluidized bed according to claim 2 wherein said gas purging means includes an elongate tube inserted into said housing, said elongate tube having at least one hole in a wall of the tube disposed along a length of the tube located in said housing.

4. The fluidized bed according to claim 1 wherein said volumetric metering means includes a particulate collector defining a pre-selected volume.

5. The fluidized bed according to claim 4 wherein said particulate collector includes a support plate having at least one cavity having said pre-selected volume.

6. The fluidized bed according to claim 5 wherein said at least one cavity is a plurality of cavities each having a pre-selected volume.

7. The fluidized bed according to claim 6 wherein said particulate collector can be attached and detached from said outlet passageway.

8. The fluidized bed according to claim 6 wherein including a plurality of particulate collectors mounted on a support member, said support member being mounted to said housing with one of said plurality of particulate collectors in said outlet passageway, including a positioning mechanism for positioning each of said particulate collectors mounted on said support member in said outlet passageway.

9. The fluidized bed according to claim 1 wherein said outlet passageway is a first outlet passageway and said volumetric metering means is a first volumetric metering means, including at least a second outlet passageway and at least a second volumetric metering means connected to said housing and in flow communication with said enclosure through at least second outlet passageway for withdrawing pre-selected amounts of said particulate matter from said housing from said at least second outlet passageway.

10. The fluidized bed according to claim 1 including timing means for controlling a length of time said particulate matter is withdrawn from said enclosure.

11. The fluidized bed according to claim 10 wherein said timing means includes valve means in said outlet passageway connected to a timer for opening and closing said valve means for controlling a length of time said particulate matter is withdrawn from said enclosure.

12. The fluidized bed according to claim 11 wherein said valve means is a solenoid located in said outlet passageway, and a control means connected to said solenoid for actuating said solenoid for opening and closing said outlet passageway.

13. The fluidized bed according to claim 1 wherein said housing includes a porous wall having a suitable porosity to allow flow of fluid through said wall while preventing most of the particulate matter contained within said housing from passing therethrough, and including a gas distribution manifold adjacent to said porous wall for injecting gas into said housing for fluidizing said particulate matter contained within said enclosure.

14. The fluidized bed according to claim 13 wherein said housing includes additional porous walls having a suitable porosity to allow flow of fluid through the additional walls while preventing most of the particulate matter contained within said housing from passing therethrough.

15. The fluidized bed according to claim 14 wherein said outlet passageway is positioned on said housing so that said particulate matter is withdrawn through said outlet passageway from said dilute phase.

16. The fluidized bed according to claim 1 wherein said housing includes a cylinder having spaced end walls defining a cylindrical housing having a cylindrical axis, wherein said cylinder is porous, said porous cylinder having a suitable porosity to allow flow of fluid through the cylinder wall while preventing most of the particulate matter contained within said housing from passing therethrough.

17. The fluidized bed according to claim 16 including rotation means for rotating said cylindrical housing about said cylindrical axis.

18. The fluidized bed according to claim 17 including a plate slidably mounted within said cylinder and drive means for moving said plate along a longitudinal axis of said cylinder for adjusting a volume of said enclosure.

19. The fluidized bed according to claim 18 including agitation means operably coupled to said fluidized bed for agitating said particulate matter inside said cylindrical housing.

20. The fluidized bed according to claim 18 including gas purging means in communication with said enclosure for removing particulate matter adhering to said housing.

21. The fluidized bed according to claim 18 wherein said volumetric metering means includes a particulate collector defining a pre-selected volume.

22. The fluidized bed according to claim 17 wherein said cylindrical housing is oriented so that said cylindrical axis is vertical, and wherein said housing rotates about said vertical axis.

23. The fluidized bed according to claim 17 wherein said cylindrical housing is oriented so that said cylindrical axis is horizontal, and wherein said cylindrical housing rotates about said horizontal axis.

24. The fluidized bed according to claim 17 including agitation means operably coupled to said fluidized bed for agitating said particulate matter inside said cylindrical housing.

25. The fluidized bed according to claim 17 including gas purging means in communication with said enclosure for removing particulate matter adhering to said housing.

26. The fluidized bed according to claim 17 wherein said volumetric metering means includes a particulate collector defining a pre-selected volume.

27. The fluidized bed according to claim 16 wherein said outlet passageway is located in an end wall located at one end of said cylinder.

28. The fluidized bed according to claim 16 wherein said volumetric metering means includes a particulate collector defining a pre-selected volume.

29. The fluidized bed according to claim 28 wherein said particulate collector includes a collector plate having at least one cavity located in a front surface of said collector plate and having said pre-selected volume, said collector plate being positioned within said outlet passageway with said front facing toward said enclosure so particles from said fluidized bed accumulate in said at least one cavity.

30. The fluidized bed according to claim 28 wherein the said particulate collector includes a support plate and a blister plate mounted on a surface of said support plate, said blister plate including at least one cavity of said pre-selected volume.

31. The fluidized bed according to claim 30 wherein said at least one cavity is a plurality of cavities each having a pre-selected volume, said cavities extending right through said blister plate, said support plate including holes through said plate and positioned so that when said blister plate is attached to said support plate the cavities in said blister plate are in registration with holes in said support plate, and including a porous filter sandwiched between said support plate and said blister plate for allowing gas to flow therethrough but not particulate matter.

32. The fluidized bed according to claim 31 wherein said particulate collector includes an elongate bar strip to which a plurality of support plates are detachably mountable with a back surface of each support plate mounted on a front surface of said elongate bar strip, a blister plate being mounted on a front surface of each support plate, and wherein said elongate bar strips are perforated at positions where said support plates are mountable.

33. The fluidized bed according to claim 32 including suction means engagable to a back surface of said elongate bar strip for applying suction to said particulate collector.

34. The fluidized bed according to claim 32 including a positioning mechanism for moving said elongate bar strip across said outlet passageway for positioning each of said blister plates mounted on said support plate in said outlet passageway.

35. The fluidized bed according to claim 16 including agitation means operably coupled to said fluidized bed for agitating said particulate matter inside said housing.

36. The fluidized bed according to claim 35 wherein said agitation means is one of a vibration generator for transmitting vibrational energy to agitate said particulate matter, an ultrasonic wave generator for transmitting ultrasonic waves to agitate said particulate matter, and an acoustic wave generator for transmitting acoustic energy to said particulate matter.

37. The fluidized bed according to claim 35 wherein said agitation means includes a gas agitation means including a pressurized gas supply in communication with said enclosure for removing particulate matter adhering to interior walls of said housing.

38. The fluidized bed according to claim 37 wherein said gas agitation means includes at least one tube having one end connected to said pressurized gas supply and at least one nozzle attached to a free end of said gas tube located in a pre-selected position within said enclosure.

39. The fluidized bed according to claim 38 where said at least one gas tube is a plurality of gas tubes, each having a nozzle attached at its free end thereof, and wherein some of said gas tubes are made of rigid material.

40. The fluidized bed according to claim 39 wherein at least one of said plurality of gas tubes is made of a flexible material so that as gas is flowed through said gas tube with an effective gas pressure said free end with said nozzle attached thereto moves about within said enclosure.

41. The fluidized bed according to claim 16 including agitation means operably coupled to said fluidized bed for agitating said particulate matter inside said cylindrical housing.

42. The fluidized bed according to claim 16 including gas purging means in communication with said enclosure for removing particulate matter adhering to said housing.

43. The fluidized bed according to claim 16 wherein said volumetric metering means includes a particulate collector defining a pre-selected volume.

44. The fluidized bed according to claim 1 wherein said housing is a cylindrical housing including a first cylinder having a first diameter and a second cylinder having a second diameter less than said first diameter with an interior of said second cylinder defining said enclosure containing said powder, said second cylinder being located within, and concentric with, said first cylinder, said second cylinder having a cylinder wall being made of a porous material, said cylindrical housing having a cylindrical axis coextensive with cylindrical axes of said first and second cylinders, said cylindrical housing including first and second end walls attached to opposed ends of said concentric cylinders, including a selected number of spaced elongate walls disposed around said second cylinder and running along the length of both cylinders, said elongate walls extending between an inner surface of said first cylinder and an exterior surface of said second cylinder thereby defining a plurality of chambers equal to the selected number of elongate walls in an annular space between said first and second cylinders.

45. The fluidized bed according to claim 44 wherein said outlet passageway is located in on the first and second end walls.

46. The fluidized bed according to claim 44 including gas purging means in communication with said enclosure for removing particulate matter adhering to said housing.

47. The fluidized bed according to claim 46 wherein said gas purging means includes an elongate tube inserted into the second cylinder and extending along its cylindrical axis, said elongate tube having at least one hole in a wall of the elongate tube disposed along a length of the tube located in said second cylinder.

48. The fluidized bed according to claim 44 wherein said first and second cylinders are mounted on a frame for rotation about said cylindrical axis, including drive means coupled to said first and second cylinders for rotating said cylinders, and wherein said end walls mounted on said frame at the ends of said concentric cylinders in sealing engagement therewith, and wherein said fluid injection means for injecting a fluid into said enclosure for fluidizing particulate matter includes a fluid inlet located in one section of one of said end walls and aligned to be in flow communication with at least one of said chambers during rotation of said concentric cylinders wherein fluid in said at least one of said chambers flows through said porous cylindrical wall into the enclosure defined by said second cylinder, including a fluid outlet passageway located in a second section of said end wall and aligned to be in flow communication with at least another chamber during rotation of said concentric cylinders wherein fluid flowing from said enclosure through said porous second cylinder wall into said at least another chamber exits through said fluid outlet passageway.

49. The fluidized bed according to claim 48 including gas purging means in communication with said enclosure for removing particulate matter adhering to said cylindrical housing.

50. The fluidized bed according to claim 49 wherein said gas purging means includes an elongate tube inserted into the second cylinder and extending along its cylindrical axis, said elongate tube having at least one hole in a wall of the tube disposed along a length of the tube located in said second cylinder.

51. The fluidized bed according to claim 48 wherein said volumetric metering means includes a particulate collector defining a pre-selected volume.

52. The fluidized bed according to claim 51 wherein said particulate collector includes a collector plate having at least one cavity located in a front surface of said collector plate and having said pre-selected volume, said collector plate being positioned within said outlet passageway with said front facing toward said enclosure so particles from said fluidized bed accumulate in said at least one cavity.

53. The fluidized bed according to claim 51 wherein the said particulate collector includes a support plate and a blister plate mounted on a surface of said support plate, said blister plate including at least one cavity of said pre-selected volume.

54. The fluidized bed according to claim 53 wherein said at least one cavity is a plurality of cavities each having a pre-selected volume, said cavities extending right through said blister plate, said support plate including holes through said plate and positioned so that when said blister plate is attached to said support plate the cavities in said blister plate are in registration with holes in said support plate, and including a porous filter sandwiched between said support plate and said blister plate for allowing gas to flow therethrough but not particulate matter.

55. The fluidized bed according to claim 54 wherein said particulate collector includes an elongate bar strip to which a plurality of support plates are detachably mountable with a back surface of each support plate mounted on a front surface of said elongate bar strip, a blister plate being mounted on a front surface of each support plate, and wherein said elongate bar strips are perforated at positions where said support plates are mountable.

56. The fluidized bed according to claim 55 including suction means engagable to a back surface of said elongate bar strip for applying suction to said particulate collector.

57. The fluidized bed according to claim 55 including a positioning mechanism for moving said elongate bar strip across said outlet passageway for positioning each of said blister plates mounted on said support member in said outlet passageway.

58. The fluidized bed according to claim 48 including agitation means operably coupled to said fluidized bed for agitating said particulate matter inside said housing.

59. The fluidized bed according to claim 58 wherein said agitation means is one of a vibration generator for transmitting vibrational energy to agitate said particulate matter, an ultrasonic wave generator for transmitting ultrasonic waves to agitate said particulate matter, and an acoustic wave generator for transmitting acoustic energy to said particulate matter.

60. The fluidized bed according to claim 58 wherein said agitation means includes a gas agitation means including a pressurized gas supply in communication with said enclosure for removing particulate matter adhering to interior walls of said housing.

61. The fluidized bed according to claim 60 wherein said gas agitation means includes at least one tube having one end connected to said pressurized gas supply and at least one nozzle attached to a free end of said gas tube located in a pre-selected position within said enclosure.

62. The fluidized bed according to claim 61 where said at least one gas tube is a plurality of gas tubes, each having a nozzle attached at its free end thereof, and wherein some of said gas tubes are made of rigid material.

63. The fluidized bed according to claim 62 wherein at least one of said plurality of gas tubes is made of a flexible material so that as gas is flowed through said gas tube with an effective gas pressure said free end with said nozzle attached thereto moves about within said enclosure.

64. The fluidized bed according to claim 44 wherein said fluid injection means for injecting a fluid into said enclosure for fluidizing particulate matter includes a fluid inlet located in said first end wall in communication with an interior of said second cylinder for injecting fluid into an interior of said second cylinder wherein said fluid flows through said porous wall of said second cylinder into said enclosure.

65. The fluidized bed according to claim 64 wherein said one of said first end wall includes a housing having a porous end wall located at the end of said second cylinder, and a nonporous annular end wall extending between, and in sealing engagement with, the end portions of said first cylinder and the second cylinder, and a nonporous wall spaced from said porous end wall defining therebetween an inlet chamber, and a fluid inlet in said nonporous wall spaced from said porous end wall, wherein fluid is injected into said inlet chamber which then passes through said porous end wall into said enclosure.

66. The fluidized bed according to claim 44 including air flow inducing means for inducing air flow patterns in said enclosure for reducing sticking of the particulate matter to interior walls, said air flow inducing means including a selected number of fluid ports located in said first cylinder and disposed about a circumference of said first cylinder with a fluid port associated with each of said chambers, each fluid port including a valve for opening and closing said fluid port, including control means for opening and closing said valves according to a pre-selected schedule.

67. The fluidized bed according to claim 1 including air flow inducing means for inducing effective air flow patterns in said enclosure for reducing sticking of the particulate matter to the housing walls.

68. The fluidized bed according to claim 2 wherein said outlet passageway for withdrawing pre-selected amounts of said particulate matter from said housing is located so that said particulate matter is withdrawn through said outlet passageway from said dilute phase.

69. The fluidized bed according to claim 67 wherein the fluidized bed is operated under conditions suitable to give a dense phase, and wherein said outlet passageway for withdrawing pre-selected amounts of said particulate matter from said housing is located so that said particulate matter is withdrawn from said dense phase.

70. The fluidized bed according to claim 1 wherein said volumetric metering means is detachable from said housing.

71. The fluidized bed according to claim 1 including agitation means operably coupled to said fluidized bed for agitating said particulate matter inside said housing.

72. The fluidized bed according to claim 71 wherein said agitation means is one of a vibration generator for transmitting vibrational energy to agitate said particulate matter, an ultrasonic wave generator for transmitting ultrasonic waves to agitate said particulate matter, and an acoustic wave generator for transmitting acoustic energy to said particulate matter.

73. The fluidized bed according to claim 71 wherein said agitation means includes a gas agitation means including a pressurized gas supply in communication with said enclosure for removing particulate matter adhering to interior walls of said housing.

74. The fluidized bed according to claim 73 wherein said gas agitation means includes at least one tube having one end connected to said pressurized gas supply and at least one nozzle attached to a free end of said gas tube located in a pre-selected position within said enclosure.

75. The fluidized bed according to claim 74 where said at least one gas tube is a plurality of gas tubes, each having a nozzle attached at its free end thereof, and wherein some of said gas tubes are made of rigid material.

76. The fluidized bed according to claim 75 wherein at least one of said plurality of gas tubes is made of a flexible material so that as gas is flowed through said gas tube with an effective gas pressure said free end with said nozzle attached thereto moves about within said enclosure.

77. A fluidized bed for dispensing powders, comprising:
   a) a housing defining an enclosure for containing particulate matter, said housing including at least one porous wall having a suitable porosity to allow flow of fluid through said porous wall while preventing most of the particulate matter contained within said housing from passing through said porous wall, a fluid injection means for injecting a fluid into said enclosure for fluidizing particulate matter contained within said housing for forming either a dilute phase only or a dilute phase and a dense phase of fluidized powder in said housing; and
   b) time controlled powder withdrawal means connected to said housing and in flow communication with said enclosure through an outlet passageway for withdrawing particulate matter from said housing for a preselected period of time.

78. The fluidized bed according to claim 77 including air flow inducing means for inducing air flow patterns in said enclosure for reducing sticking of the particulate matter to the housing walls.

79. The fluidized bed according to claim 78 wherein said housing includes a cylinder having spaced end walls defining a cylindrical housing having a cylindrical axis, wherein said cylinder is porous, and including rotational drive means for rotating said cylinder about said cylindrical axis.

80. The fluidized bed according to claim 77 wherein said time controlled powder withdrawal means includes valve means in said outlet passageway connected to a timer for opening and closing said outlet passageway for controlling a length of time said particulate matter is withdrawn from said enclosure.

81. The fluidized bed according to claim 80 wherein said valve means is a solenoid located in said outlet passageway, and a control means connected to said solenoid for actuating said solenoid for opening and closing said outlet passageway.

82. A fluidized bed for dispensing powders including a housing defining an enclosure for containing particulate matter, said housing including a fluid injection means for injecting a fluid into said enclosure for fluidizing particulate matter contained within said housing for forming a dilute phase alone or a dilute phase and a dense phase of fluidized powder in said housing, and volumetric metering means connected to said housing and in flow communication with said enclosure through an outlet passageway for withdrawing pre-selected amounts of said particulate matter from said housing.

\* \* \* \* \*